(12) United States Patent
Jiang et al.

(10) Patent No.: US 12,328,739 B2
(45) Date of Patent: Jun. 10, 2025

(54) SIGNALING SOLUTION FOR FAST BEAM DIVERSITY

(71) Applicant: ZTE CORPORATION, Guangdong (CN)

(72) Inventors: Chuangxin Jiang, Shenzhen (CN); Zhaohua Lu, Shenzhen (CN); Hao Wu, Shenzhen (CN); Bo Gao, Shenzhen (CN); Shujuan Zhang, Shenzhen (CN); Wenjun Yan, Shenzhen (CN); Meng Mei, Shenzhen (CN); Shijia Shao, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 304 days.

(21) Appl. No.: 17/851,076

(22) Filed: Jun. 28, 2022

(65) Prior Publication Data
US 2022/0330321 A1 Oct. 13, 2022

Related U.S. Application Data

(63) Continuation of application No. PCT/CN2020/103164, filed on Jul. 21, 2020.

(51) Int. Cl.
*H04W 72/23* (2023.01)
*H04L 1/08* (2006.01)

(52) U.S. Cl.
CPC ............ *H04W 72/23* (2023.01); *H04L 1/08* (2013.01)

(58) Field of Classification Search
CPC ............ H04W 72/23; H04W 72/1263; H04W 72/569; H04W 72/0446; H04W 72/0457;
(Continued)

(56) References Cited

U.S. PATENT DOCUMENTS

2019/0313436 A1* 10/2019 Lee ........................ H04L 5/0051
2021/0006376 A1* 1/2021 Cirik ...................... H04L 5/0094
(Continued)

FOREIGN PATENT DOCUMENTS

| CN | 109565678 A | 4/2019 |
|---|---|---|
| CN | 111246582 A | 6/2020 |

(Continued)

OTHER PUBLICATIONS

Apple Inc., "On Further MIMO Enhancement" 3GPP TSG RAN WG1 #100b, R1-2004234, May 25, 2020, e-Meeting (10 pages).
(Continued)

*Primary Examiner* — Edan Orgad
*Assistant Examiner* — Vladislav Y Agureyev
(74) *Attorney, Agent, or Firm* — Foley & Lardner LLP

(57) ABSTRACT

Presented are systems and methods for improving fast beam diversity. A wireless communication device may receive N scheduling grants to schedule a plurality of repetitive transmissions of a same data block from a wireless communication node, wherein N is greater than or equal to 2. At least two of the repetitive transmissions may overlap at a time instance. The wireless communication device may communicate only one of the at least two repetitive transmissions that overlap at the time instance to the wireless communication node.

18 Claims, 13 Drawing Sheets

(58) Field of Classification Search
CPC ......... H04L 1/08; H04L 5/001; H04L 5/0023; H04L 5/0053; H04L 5/0094; H04B 7/024; H04B 7/0408
See application file for complete search history.

(56) References Cited

U.S. PATENT DOCUMENTS

| | | | | |
|---|---|---|---|---|
| 2021/0234640 | A1* | 7/2021 | Cirik | H04L 1/1819 |
| 2021/0307050 | A1* | 9/2021 | Khoshnevisan | H04L 5/0055 |
| 2021/0307070 | A1* | 9/2021 | Kim | H04L 25/0226 |
| 2022/0132563 | A1* | 4/2022 | Kim | H04W 74/08 |
| 2022/0149997 | A1* | 5/2022 | Wang | H04L 1/1864 |
| 2022/0353698 | A1* | 11/2022 | Jang | H04L 5/0023 |
| 2022/0369297 | A1* | 11/2022 | Takahashi | H04L 5/0048 |
| 2022/0386156 | A1* | 12/2022 | Park | H04W 24/10 |
| 2023/0087223 | A1* | 3/2023 | Jang | H04L 1/1896 370/329 |

FOREIGN PATENT DOCUMENTS

| | | | | |
|---|---|---|---|---|
| EP | 4135441 | A1 * | 2/2023 | ........... H04L 1/1854 |
| KR | 2019-0017675 | A | 2/2019 | |
| WO | WO-2020/033660 | A1 | 2/2020 | |
| WO | WO-2020/033660 | A8 | 2/2020 | |
| WO | WO-2020/040179 | A1 | 2/2020 | |

OTHER PUBLICATIONS

Apple Inc., "Remaining Issues for Multi-TRP Enhancement" 3GPP TSG RAN WG1 #101, R1-2004229, May 25, 2020, e-Meeting (12 pages).
Apple Inc., "Remaining Issues on Multi-beam operation" 3GPP TSG RAN WG1 #101, R1-2004230, May 25, 2020, e-Meeting (12 pages).
Catt, "Remaining issues on multi-beam enhancements" 3GPP TSG RAN WG1 #99, R1-1912177, Nov. 22, 2019, Reno, USA (6 pages).
Ericsson, "High Level Views on Rel-17 feMIMO" 3GPP TSG-RAN WG1 Meeting #101-e, R1-2004633, May 25, 2020, e-Meeting (15 pages).
Extended European Search Report for EP Appl. No. 20946064.1, dated Oct. 28, 2022 (9 pages).
Moderator (Oppo), "FL summary #2 for Multi-TRP/Panel Transmission" 3GPP TSG RAN WG1 #100bis, R1-2002730, Apr. 20, 2020, e-Meeting (50 pages).
Moderator (Oppo), "FL summary for Multi-TRP/Panel Transmission" 3GPP TSG RAN WG1 #100bis, R1-2002406, Apr. 20, 2020, e-Meeting (34 pages).
Moderator (Oppo), "Summary of email thread [100b-e-NR-eMIMO-multiTRP-03]" 3GPP TSG RAN WG1 #100bis, R1-2002949, Apr. 20, 2020, e-Meeting (17 pages).
Oppo, "Remaining issues on Multi-TRP and panel Transmission" 3GPP TSG RAN WG1 #101, R1-2004051, May 25, 2020, e-Meeting (5 pages).
Oppo, "Text proposals for enhancements on Multi-TRP and panel Transmission" 3GPP TSG RAN WG1 #101, R1-2004047, May 25, 2020, e-Meeting (11 pages).
Qualcomm Incorporated, "Enhancements on Multi-beam Operation" 3GPP TSG RAN WG1 Meeting #101-e, R1-2004464, May 25, 2020, e-Meeting (7 pages).
Qualcomm Incorporated, "Multi-TRP Enhancements" 3GPP TSG RAN WG1 #101-e, R1-2004463, May 25, 2020, e-Meeting (11 pages).
Qualcomm Incorporated, "PDCCH-based power saving channel design" 3GPP TSG-RAN WG1 #99, R1-1912970, Nov. 18, 2019, Reno, USA (19 pages).
Qualcomm Incorporated, "TP for Enhancements to Scheduling and HARQ operation for NR-U" 3GPP TSG RAN WG1 Meeting #101-e, R1-2004445, May 25, 2020 (6 pages).
Samsung, "Enhancements on MIMO for NR" 3GPP TSG RAN Meeting #88e, RP-200618, Jun. 29, 2020, e-Meeting (21 pages).
Samsung, "Enhancements on MIMO for NR" 3GPP TSG RAN Meeting #88e, RP-201255, Jun. 29, 2020, e-Meeting (21 pages).
Samsung, "On Rel. 17 FeMIMO WI" 3GPP TSG RAN WG1 #101, R1-2003918, May 25, 2020, e-Meeting (12 pages).
Samsung, "View on Further Enhancements on MIMO for NR" 3GPP TSG-RAN Meeting # 88e, RP-200619, Jun. 29, 2020, e-Meeting (18 pages).
Sony, "Considerations on UL Intra-UE Tx Multiplexing" 3GPP TSG RAN WG1 #96, R1-1902182, Mar. 1, 2019, Athens, Greece (9 pages).
ZTE, "Enhancements on Multi-TRP and Multi-panel Transmission" 3GPP TSG RAN WG1 #99, R1-1911930, Nov. 18, 2019, Reno, USA (14 pages).
ZTE, "Further details on multi-beam/TRP operation" 3GPP TSG RAN WG1 Meeting #99, R1-1911933, Nov. 18, 2019, Reno, US (10 pages).
ZTE, "Preliminary views on further enhancement for NR MIMO" 3GPP TSG RAN WG1 Meeting #101-e, R1-2003483, May 25, 2020, e-Meeting (18 pages).
First Office Action for CN Appl. No. 202080102354.0, dated Jul. 12, 2024 (with English translation, 16 pages).
Ericsson: "High Level Views on Rel-17 feMIMO" 3GPP TSG-RAN WG1 Meeting #101-e; R1-2004633; Jun. 5, 2020; eMeeting (15 pages).
International Search Report and Written Opinion for PCT Appl. No. PCT/CN2020/103164 mailed Mar. 26, 2021 (9 pages).
NTT Docomo, Inc.: "Enhancements on multi-TRP/panel transmission" 3GPP TSG RAN WG1 #97; R1-1906224; May 17, 2019; Reno, USA (32 pages).
Samsung: "View on Further Enhancements on MIMO for NR" 3GPP TSG-RAN Meeting #88e; RP-200619; Jul. 3, 2020; Electronic Meeting (18 pages).
First KR Office Action on KR AppIn No. 10-2022-7022130, dated Mar. 26, 2025 (8 pages, including English translation).

* cited by examiner

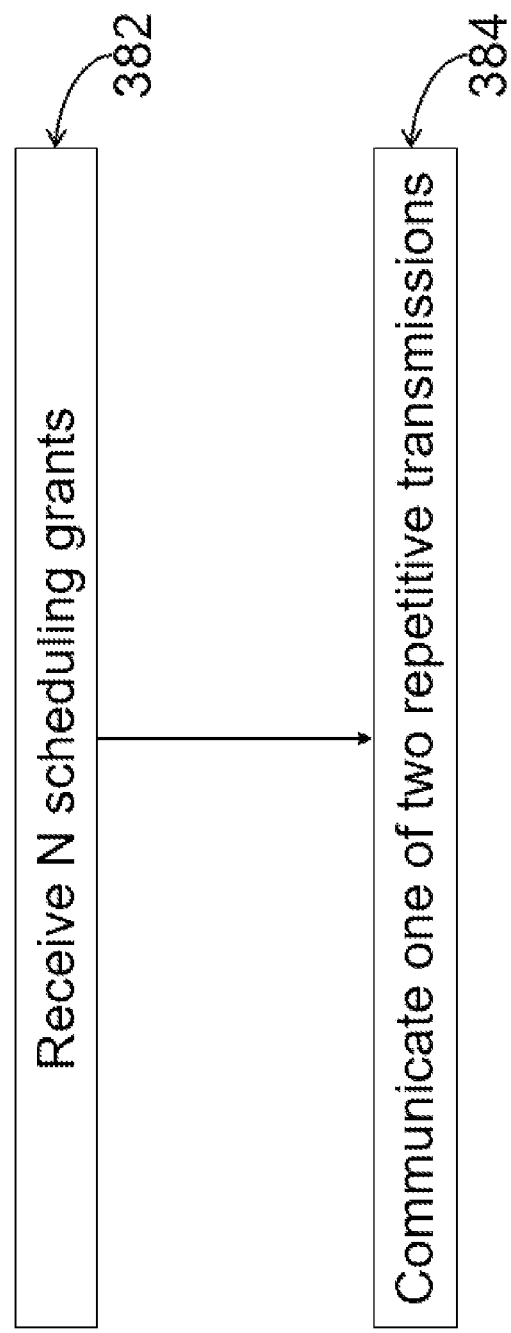

SIGNALING SOLUTION FOR FAST BEAM DIVERSITY

CROSS-REFERENCE TO RELATED APPLICATION

This application claims the benefit of priority under 35 U.S.C. § 120 as a continuation of PCT Patent Application No. PCT/CN2020/103164, filed on Jul. 21, 2020, the disclosure of which is incorporated herein by reference in its entirety.

TECHNICAL FIELD

The disclosure relates generally to wireless communications, including but not limited to systems and methods for improving fast beam diversity.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). In a wireless communication system (e.g., a 5G NR wireless communication system), one or more transmissions may utilize a same analog beam. A blockage of the analog beam may prevent, affect, and/or impact the transmission. Therefore, the blockage may affect and/or impact the fast beam diversity gain.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive N scheduling grants to schedule a plurality of repetitive transmissions of a same data block from a wireless communication node, wherein N is greater than or equal to 2. At least two of the repetitive transmissions may overlap at a time instance. The wireless communication device may communicate only one of the at least two repetitive transmissions that overlap at the time instance to the wireless communication node.

In some embodiments, the plurality of repetitive transmissions may comprise N groups of repetitive transmissions, and each of the repetitive transmissions is located in one of a plurality of time domain units. In some embodiments, a first of the N groups may include repetitive transmissions in at least a first time domain unit, a $(N+1)^{th}$ time domain unit if the $(N+1)^{th}$ time domain unit exists, and a $(2N+1)^{th}$ time domain unit of the plurality of time domain units if the $(2N+1)$th time domain unit exists. In some embodiments, a second of the N groups may include repetitive transmissions in at least a second time domain unit, a $(N+2)^{th}$ time domain unit if the $(N+2)^{th}$ time domain unit exists, and a $(2N+2)^{th}$ time domain unit of the plurality of time domain units if the $(2N+2)^{th}$ time domain unit exists.

In some embodiments, each of the plurality of time domain units may have a duration of X time slots, where X is greater than or equal to 1. In some embodiments, each of the plurality of time domain units may have a duration of X occasions of repetitive transmissions in time domain, where X is greater than or equal to 1. In some embodiments, an n-th group of the N groups may correspond to an n-th scheduling grant of the N scheduling grants. In some embodiments, in the n-th group of the N groups, only repetitive transmissions scheduled by the n-th scheduling grant may be communicated between the wireless communication device and the wireless communication node.

In some embodiments, an n-th scheduling grant and a (n+1)-th scheduling grant of the N scheduling grants may be associated with at least one of different corresponding control resource set (CORESET) pool identifiers or different corresponding control resource set (CORESET) identifiers. In some embodiments, an n-th scheduling grant and a (n+1)-th scheduling grant of the N scheduling grants may be associated with a different time location for each of the n-th scheduling grant and the (n+1)-th scheduling grant. In some embodiments, an n-th scheduling grant and a (n+1)-th scheduling grant of the N scheduling grants may be associated with a different time location for a first or last repetitive transmission scheduled by each of the n-th scheduling grant and the (n+1)-th scheduling grant. In some embodiments, the n-th scheduling grant may be configured with a CORESET pool identifier or CORESET identifier of smaller value than that of the (n+1)-th scheduling grant. In some embodiments, the n-th scheduling grant may be configured with a CORESET pool identifier or CORESET identifier of larger value than that of the (n+1)-th scheduling grant.

In some embodiments, the n-th scheduling grant may occur before the (n+1)-th scheduling grant. In some embodiments, the n-th scheduling grant may occur after the (n+1)-th scheduling grant. In some embodiments, a first symbol of the n-th scheduling grant may occur before a first symbol of the (n+1)-th scheduling grant. In some embodiments, a first symbol of the n-th scheduling grant may occur after a first symbol of the (n+1)-th scheduling grant. In some embodiments, a last symbol of the n-th scheduling grant may occur before a last symbol of the (n+1)-th scheduling grant. In some embodiments, a last symbol of the n-th scheduling grant may occur after a last symbol of the (n+1)-th scheduling grant.

In some embodiments, a first symbol of repetitive transmissions scheduled by the n-th scheduling grant may occur before a first symbol of repetitive transmissions scheduled by the (n+1)-th scheduling grant. In some embodiments, a first symbol of repetitive transmissions scheduled by the n-th scheduling grant may occur after a first symbol of repetitive transmissions scheduled by the (n+1)-th scheduling grant. In some embodiments, a last symbol of repetitive transmissions scheduled by the n-th scheduling grant may occur before a last symbol of repetitive transmissions scheduled by the (n+1)-th scheduling grant. In some embodiments, a last symbol of repetitive transmissions scheduled by the n-th scheduling grant may occur after a last symbol of repetitive transmissions scheduled by the (n+1)-th scheduling grant.

In some embodiments, the wireless communication device may communicate only one of the at least two repetitive transmissions that overlap, that is scheduled by a first or Nth one of the N scheduling grants, to the wireless communication node. In some embodiments, at least two of the repetitive transmissions may overlap at least in time domain within one bandwidth part (BWP), and each of the at least two of the repetitive transmissions is scheduled by a different one of the M scheduling grants. In some embodiments, the at least two of the repetitive transmissions may overlap in a same resource element.

At least one aspect is directed to a system, method, apparatus, or a computer-readable medium. A wireless communication node may transmit N scheduling grants to schedule a plurality of repetitive transmissions of a same data block to a wireless communication device, wherein N is greater than or equal to 2. At least two of the repetitive transmissions may overlap at a time instance. The wireless communication node may communicate only one of the at least two repetitive transmissions that overlap at the time instance to the wireless communication device.

In some embodiments, the plurality of repetitive transmissions may comprise N groups of repetitive transmissions, and each of the repetitive transmissions is located in one of a plurality of time domain units. In some embodiments, a first of the N groups may include repetitive transmissions in at least a first time domain unit, a $(N+1)^{th}$ time domain unit if the $(N+1)^{th}$ time domain unit exists, and a $(2N+1)^{th}$ time domain unit of the plurality of time domain units if the (2N+1)th time domain unit exists. In some embodiments, a second of the N groups may include repetitive transmissions in at least a second time domain unit, a $(N+2)^{th}$ time domain unit if the $(N+2)^{th}$ time domain unit exists, and a $(2N+2)^{th}$ time domain unit of the plurality of time domain units if the $(2N+2)^{th}$ time domain unit exists.

In some embodiments, each of the plurality of time domain units may have a duration of X time slots, where X is greater than or equal to 1. In some embodiments, each of the plurality of time domain units may have a duration of X occasions of repetitive transmissions in time domain, where X is greater than or equal to 1. In some embodiments, an n-th group of the N groups may correspond to an n-th scheduling grant of the N scheduling grants. In some embodiments, in the n-th group of the N groups, only repetitive transmissions scheduled by the n-th scheduling grant may be communicated between the wireless communication node and the wireless communication device.

In some embodiments, an n-th scheduling grant and a (n+1)-th scheduling grant of the N scheduling grants may be associated with at least one of different corresponding control resource set (CORESET) pool identifiers or different corresponding control resource set (CORESET) identifiers. In some embodiments, an n-th scheduling grant and a (n+1)-th scheduling grant of the N scheduling grants may be associated with a different time location for each of the n-th scheduling grant and the (n+1)-th scheduling grant. In some embodiments, an n-th scheduling grant and a (n+1)-th scheduling grant of the N scheduling grants may be associated with a different time location for a first or last repetitive transmission scheduled by each of the n-th scheduling grant and the (n+1)-th scheduling grant. In some embodiments, the n-th scheduling grant may be configured with a CORESET pool identifier or CORESET identifier of smaller value than that of the (n+1)-th scheduling grant.

In some embodiments, the n-th scheduling grant may occur before the (n+1)-th scheduling grant. In some embodiments, the n-th scheduling grant may occur after the (n+1)-th scheduling grant. In some embodiments, a first symbol of the n-th scheduling grant may occur before a first symbol of the (n+1)-th scheduling grant. In some embodiments, a first symbol of the n-th scheduling grant may occur after a first symbol of the (n+1)-th scheduling grant. In some embodiments, a last symbol of the n-th scheduling grant may occur before a last symbol of the (n+1)-th scheduling grant. In some embodiments, a last symbol of the n-th scheduling grant may occur after a last symbol of the (n+1)-th scheduling grant.

In some embodiments, a first symbol of repetitive transmissions scheduled by the n-th scheduling grant may occur before a first symbol of repetitive transmissions scheduled by the (n+1)-th scheduling grant. In some embodiments, a first symbol of repetitive transmissions scheduled by the n-th scheduling grant may occur after a first symbol of repetitive transmissions scheduled by the (n+1)-th scheduling grant. In some embodiments, a last symbol of repetitive transmissions scheduled by the n-th scheduling grant may occur before a last symbol of repetitive transmissions scheduled by the (n+1)-th scheduling grant. In some embodiments, a last symbol of repetitive transmissions scheduled by the n-th scheduling grant may occur after a last symbol of repetitive transmissions scheduled by the (n+1)-th scheduling grant.

In some embodiments, the wireless communication node may communicate only one of the at least two repetitive transmissions that overlap, that is scheduled by a first or Nth one of the N scheduling grants, to the wireless communication device. In some embodiments, at least two of the repetitive transmissions may overlap at least in time domain within one bandwidth part (BWP), and each of the at least two of the repetitive transmissions is scheduled by a different one of the M scheduling grants. In some embodiments, the at least two of the repetitive transmissions may overlap in a same resource element.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 13 illustrates a flow diagram of an example method of improving fast beam diversity gain, in accordance with an embodiment of the present disclosure.

DETAILED DESCRIPTION

Figure 1:
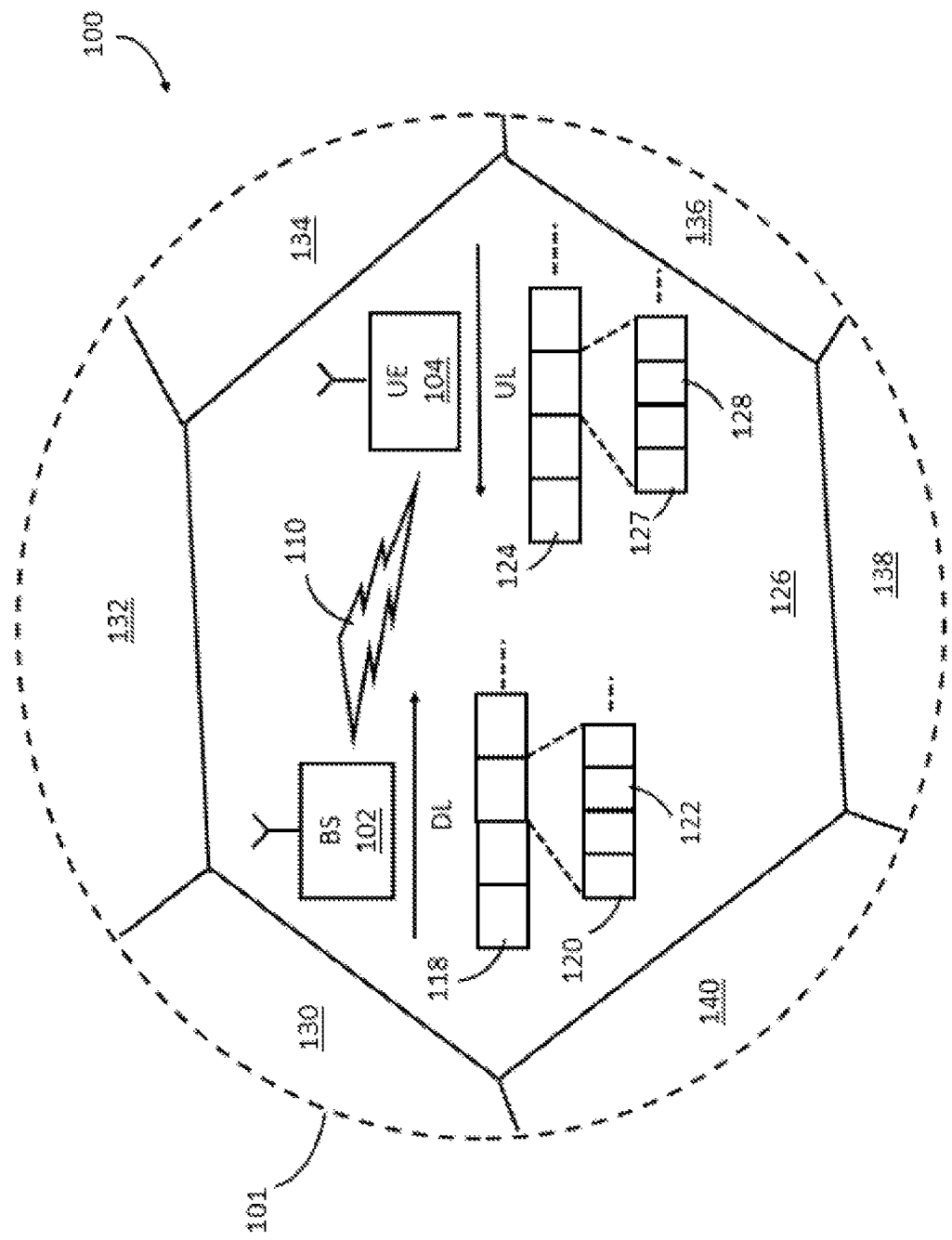
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |

-continued

| Acronym | Full Name |
| --- | --- |
| NG-RAN | Next Generation Node Radio Access Node |
| NR | New radio |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
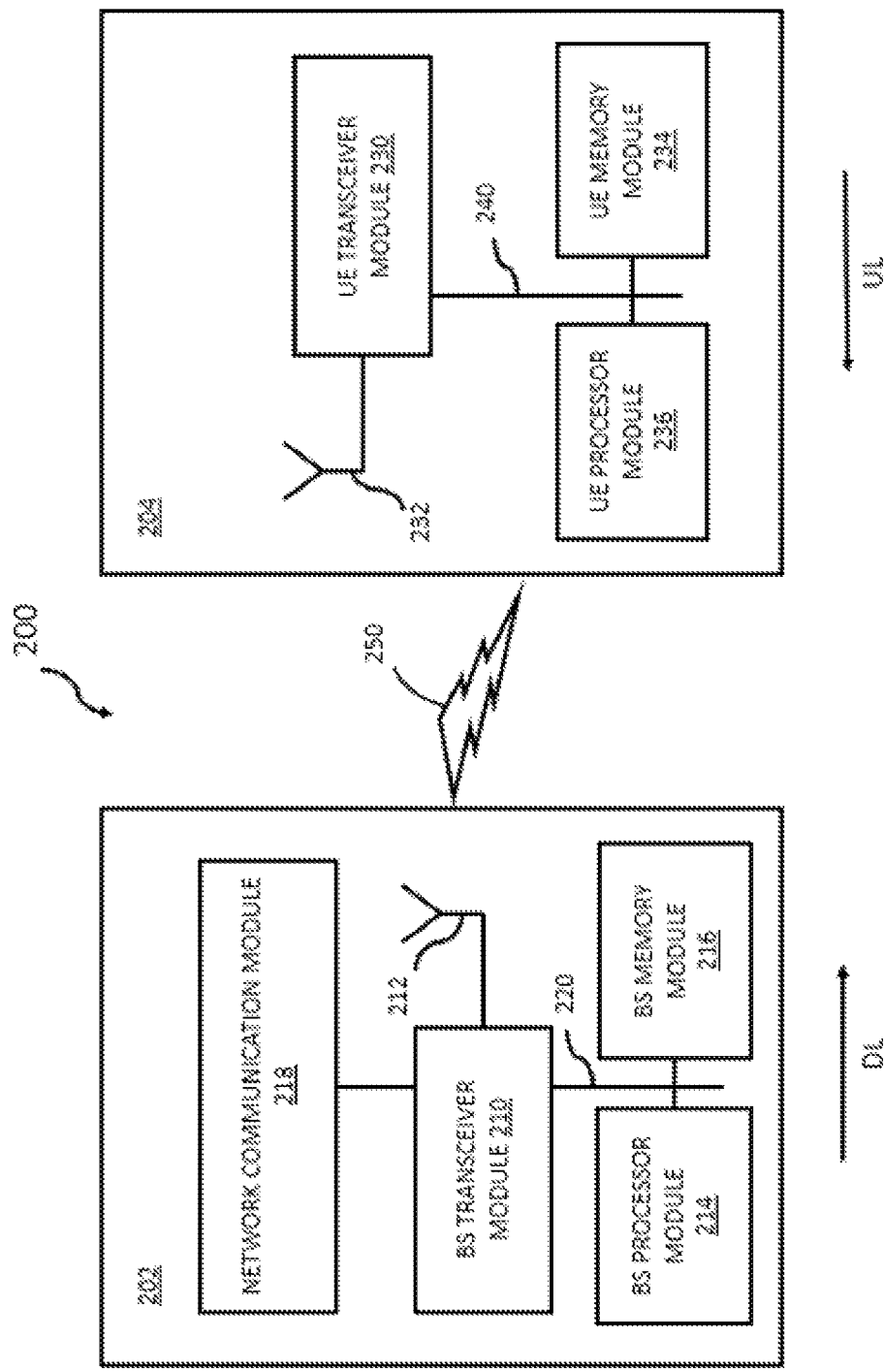
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively.

Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Improving Fast Beam Diversity

Figure 3:
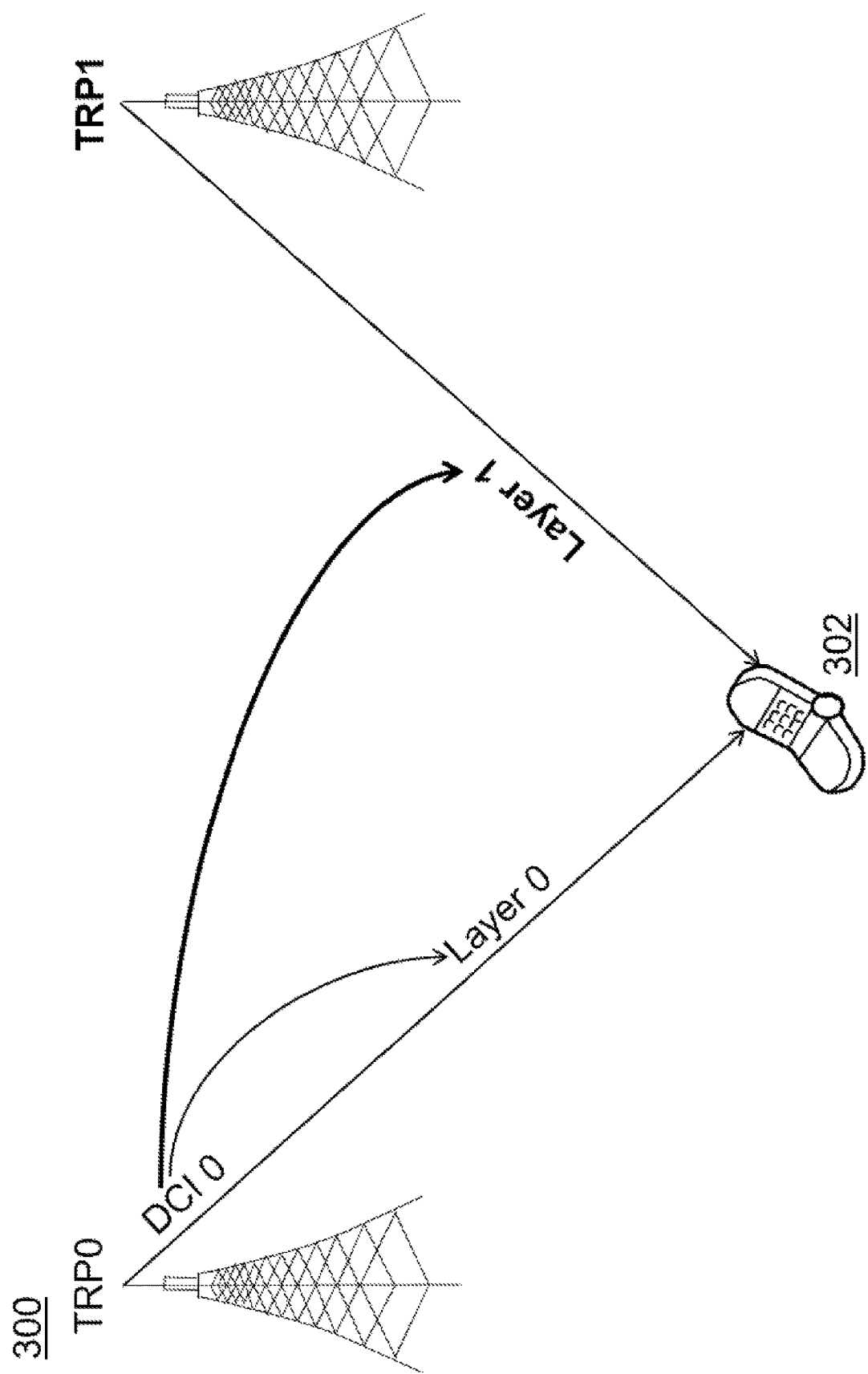
FIGS. 3-5 illustrate various approaches for transmitting downlink data utilizing multiple transmit-receive points (MTRP) and one or more scheduling grants, in accordance with some embodiments of the present disclosure.

Referring now to FIG. 3, depicted is a representation 300 of an example downlink transmission that utilizes multiple transmit-receive points (MTRP) and a single scheduling grant (e.g., DCI). Certain systems can support transmissions that use a single DCI and MTRP. In single DCI-based MTRP transmission(s), the wireless communication node(s) may schedule one or more downlink channel transmissions (e.g., physical downlink shared channel (PDSCH) transmissions and/or other downlink channel transmissions) using one scheduling grant (e.g., DCI, radio resource control (RRC) signaling, and/or other indicators). For example, a PDSCH transmission from TRP0 and/or a PDSCH transmission from TRP1 may be scheduled using DCI0. Either one of the one or more transmit-receive points (TRPs) may send/transmit/ broadcast the scheduling grant (e.g., DCI, RRC signaling, and/or other grants). For example, TRP1 or TRP0 may send/transmit DCI0 to a wireless communication device. In some embodiments, two or more TRPs may send/transmit via one or more layers to the wireless communication device (e.g., UE 302) at a given time. For example, TRP0 and TRP1 may send/transmit via Layer 0 and Layer 1 respectively to a UE 302. In the case of ideal backhaul between two or more TRPs (e.g., TRP0 and TRP1), a single scheduling grant (e.g., DCI0 or another indicator) may provide and/or indicate information to schedule a downlink channel (e.g., a PDSCH via one or more layers from two TRPs) transmission. The downlink channel transmissions from the TRPs may use at least two layers (e.g., Layer 0, Layer, 1, and/or other layers). The at least two layers may be spatially multiplexed in the same physical time and/or frequency resources (e.g., the at least two layers may utilize a spatial division multiplexing (SDM) scheme).

Figure 4:
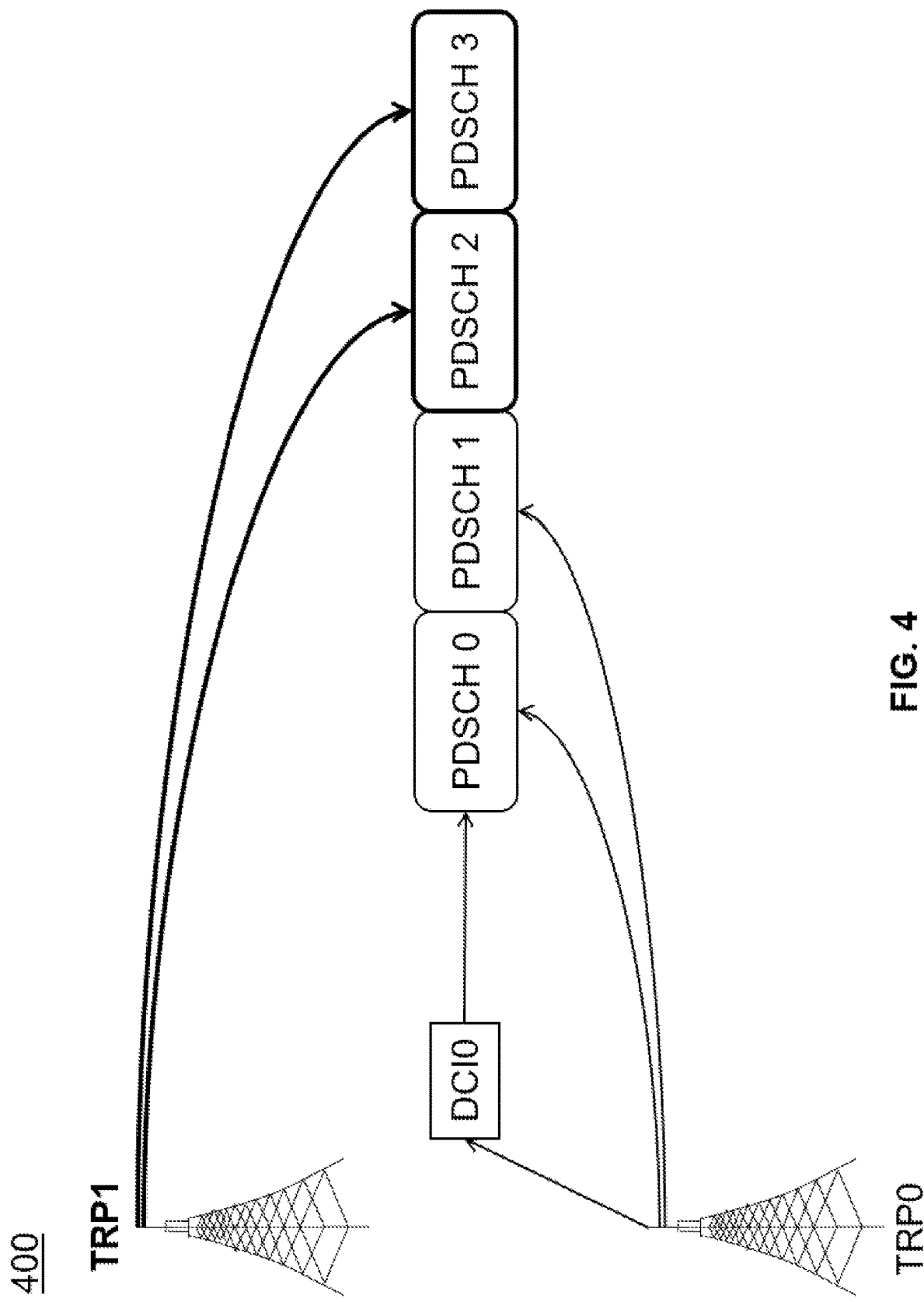

Referring now to FIG. 4, depicted is a representation 400 of an example downlink transmission utilizing MTRP and a single scheduling grant (e.g., DCI). In some embodiments, one or more TRPs may send/transmit/broadcast one or more downlink channels (e.g., PDSCH or other downlink channels) to a wireless communication device (e.g., a UE 302) using a time division multiplexing (TDM) scheme. For example TRP0 and/or TRP1 may transmit/send one or more PDSCHs (e.g., PDSCH0, PDSCH1, PDSCH2, PDSCH3 and/or other PDSCHs) to a UE 302 using TDM. In some embodiments, one or more downlink channels may include/ carry (e.g., transport, communicate, convey) the same data block and/or information. For example, PDSCH0 and PDSCH1 may include/carry the same data block and/or information. In another example, PDSCH2 and PDSCH3 may include/carry the same data block and/or information. The downlink channels (e.g., PDSCHs) that include/carry the same data block may be referred to as repetition occasions or repetitive transmissions. The scheduling grant (e.g., DCI0) may provide/specify information to schedule the downlink transmission(s) (e.g., PDSCH0, PDSCH1, PDSCH2, and/or PDSCH3) from the one or more TRPs (e.g., TRP0 and/or TRP1). Either one of the one or more TRPs may generate/transmit/provide the scheduling grant (e.g., DCI, RRC signaling, and/or other indicators). For example, TRP0 or TRP1 may generate/send/transmit DCI0. The wireless communication node(s) may save/reduce DCI related (e.g., transmission, processing) overhead and/or improve/increase transmission reliability for PDSCH transmissions by using a single DCI.

The carrier frequencies of frequency range 2 (FR2) may exceed the carrier frequencies of other frequency ranges. For example, the carrier frequencies of FR2 may exceed the carrier frequencies of frequency range 1 (FR1) or other frequency ranges. In some embodiments, blockage may occur in FR 2 (or other frequency ranges). If blockage occurs, the blockage may affect/impact/impede the transmission(s) from one or more TRPs. For example, the blockage may affect/impact/impede the PDSCH (e.g., PDSCH0, PDSCH1, PDSCH2, and/or PDSCH3) transmissions from TRP0 and/or TRP1. If the blockage affects/interrupts/impacts the transmission(s) from one TRP, the wireless communication device may still receive/obtain/detect the complete transmission(s) from another TRP (e.g., a TRP that is not affected by blockage). For example, if the blockage affects the transmission(s) from TRP0, the wireless communication device may receive the complete transmission(s) from TRP1 (e.g., the transmissions are repetition occasions). Therefore, using MTRP may enhance/improve the robustness of downlink channel transmissions (e.g., PDSCH transmissions) in FR2 (or other frequency ranges).

In some embodiments, the blockage may interrupt/affect the single scheduling grant (e.g., DCI) transmission from the wireless communication node (e.g., TRP). If the scheduling grant transmission is blocked, the wireless communication device may be unable to receive/obtain/decode the downlink channel transmission. For example, if the DCI0 transmission from TRP0 is blocked, the UE 302 may be unable to receive/decode the PDSCH0 and/or PDSCH1 transmissions. The DCI (or other scheduling grants) may include/provide scheduling information of the PDSCH, such as time/frequency resource location, modulation and coding scheme (MCS), and/or other information. The wireless communication device/node may use the information provided/indicated/specified by the DCI for the downlink channel (e.g., PDSCH) transmission.

Figure 5:
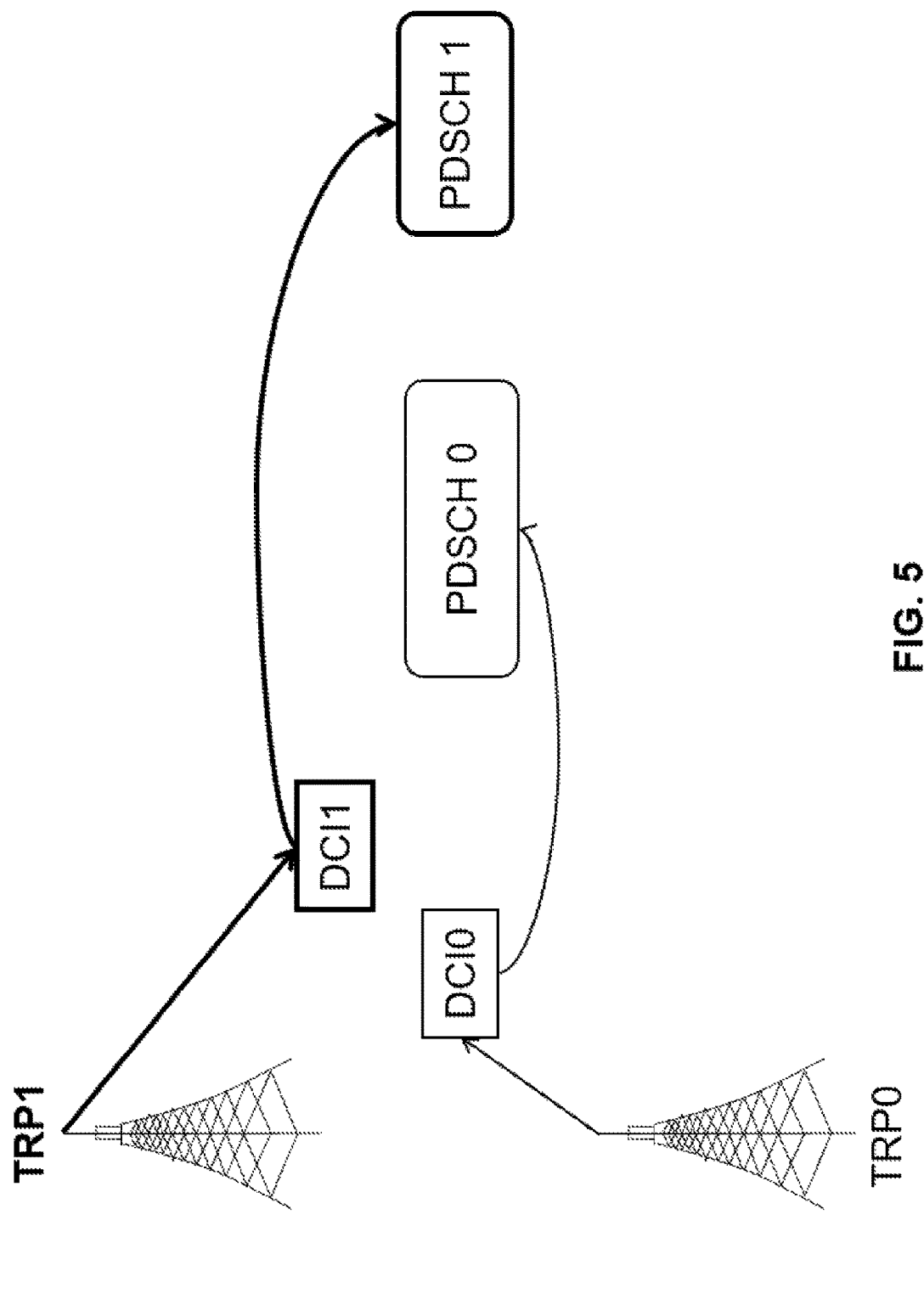

Referring now to FIG. 5, depicted is a representation 500 of an example downlink transmission that utilizes MTRP and two or more scheduling grants (e.g. two or more DCIs). Multiple DCI-based MTRP transmissions can be used to address scheduling grant transmission blockages. In some embodiments, two or more wireless communication nodes (e.g., TRPs) may transmit/send at least one scheduling grant each. For example, TRP0 and TRP1 may each send/transmit a DCI (e.g., DCI0 and DCI1 respectively). The scheduling grants (e.g., DCI0 and/or DCI1) may provide/specify information to schedule the downlink channel transmissions. For example, DCI0 and DCI1 may provide/specify information to schedule PDSCH0 and PDSCH1 respectively. The scheduling grant(s) transmissions from the two or more TRPs may provide/specify information to schedule separate/distinct downlink channel (e.g., PDSCH) transmissions. For example, DCI0 may provide/specify information to schedule PDSCH0, which may be separate/distinct from PDSCH1. One or more values of the RRC parameter coresetPoolIndex-r16 (e.g., corresponding to a CORESET pool index, or other parameters) may be used to configure/determine the scheduling grants (e.g., the DCIs). In some embodiments, one or more values of coresetPoolIndex-r16 may indicate/correspond to a particular TRP.

Using MTRP and a plurality of scheduling grants may enhance/improve the reliability of downlink channel transmissions (e.g., PDSCH transmissions) in FR2 (or other frequency ranges). However, certain systems may fail to provide similar enhancements/improvements for uplink channel (e.g., PUSCH or other uplink channels) transmissions. The transmission power of uplink channel transmissions may be less than the transmission power of downlink channel transmissions. Therefore, it may be difficult to ensure uplink coverage and/or reliability. The systems and methods presented herein include a novel approach to improve and/or increase beam diversity gain via signaling solutions by at least 25% (e.g., 35, 45 or other percent) for example.

In some embodiments, transmissions that utilize MTRP and a single scheduling grant (e.g., DCI) may improve the reliability of uplink data transmissions. For example, the wireless communication device(s) may transmit two or more PUSCH repetitions using TDM and a single DCI (or other scheduling grants). In FR2, the use of analog beams may achieve beamforming gain and/or compensate the large pathloss. The narrow bandwidth of the analog beams may cause the analog beams to be highly vulnerable to blockage by an entity (e.g., human bodies). If the bandwidth is narrow, utilizing a single DCI and MTRP may be an ineffective approach. However, the wireless communication device may send/transmit/broadcast one or more uplink channels (e.g., PUSCHs) to one or more wireless communication nodes (e.g., TRPs). For example, the wireless communication device may use one or more analog beams to transmit one or more PUSCHs via one or more beam directions. In some embodiments, the wireless communication node may send/transmit a single scheduling grant (e.g., DCI) using a single beam. If the single beam is blocked, the wireless communication device may be unable to receive/obtain the scheduling grant. As a result, the wireless communication device may be unable to transmit the intended repetitions (e.g., PUSCH repetitions).

Figure 6:
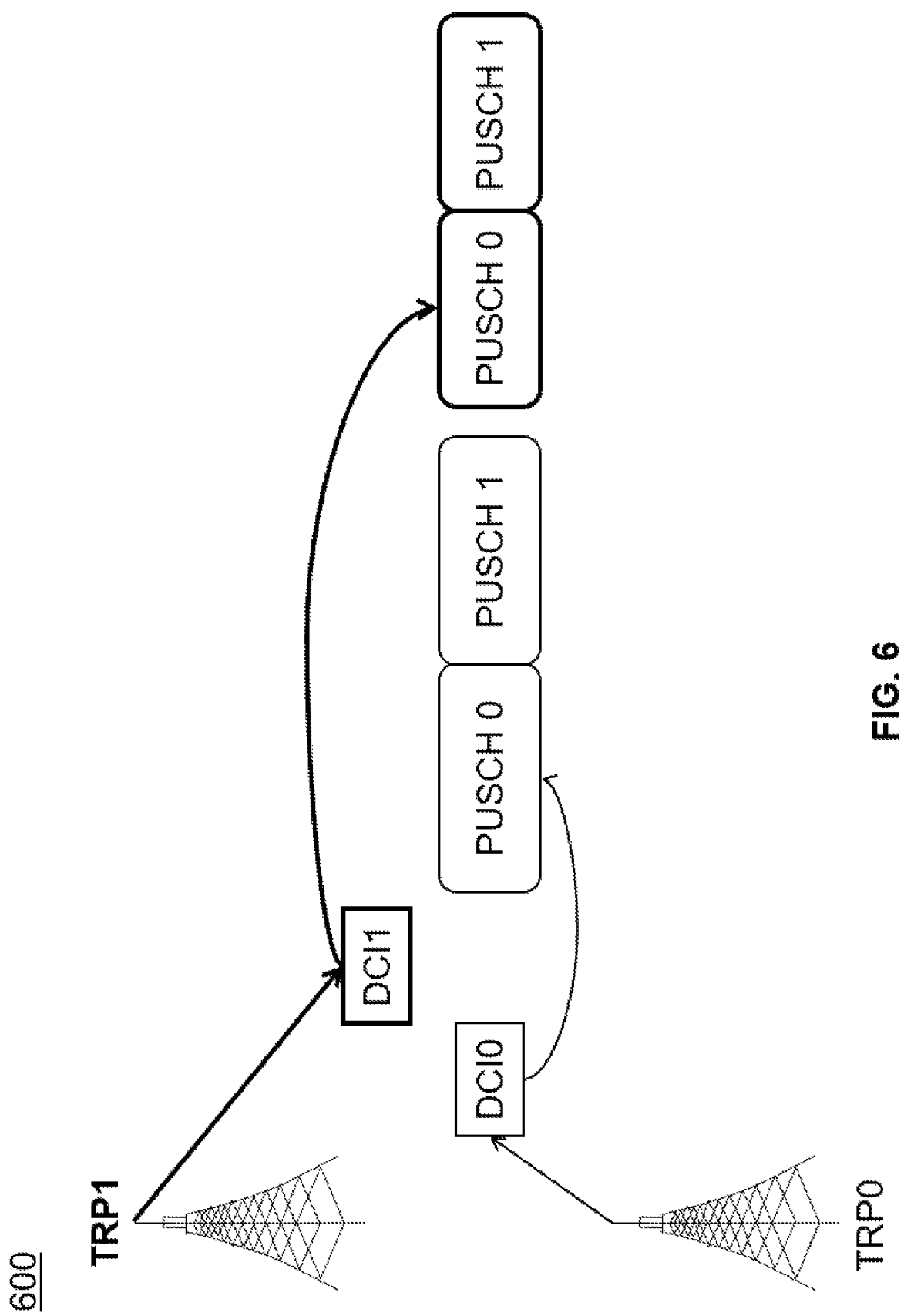
FIG. 6 illustrates example approaches for transmitting uplink data utilizing MTRP and two or more scheduling grants, in accordance with some embodiments of the present disclosure.

Referring now to FIG. 6 depicted is a representation 600 of an example uplink transmission that utilizes MTRP and two or more scheduling grants (e.g. two or more DCIs). Two or more uplink channel transmissions (e.g., PUSCH transmissions) may carry/include the same data block to improve and/or increase the reliability of uplink channel transmissions via redundancy/duplication. For example, the PUSCHs of DCI0 (e.g., PUSCH0 and PUSCH1) may carry/include the same data block to improve the reliability via redundancy/repetition. In another example, the PUSCHs of DCI1 (e.g., PUSCH0 and PUSCH1) may carry/include the same data block to improve the reliability via redundancy/repetition. The PUSCHs of the two DCIs (e.g., DCI0 and DCI1) may have different lengths.

The wireless communication node may receive/obtain the uplink channel transmissions and perform soft combining on the received transmissions (e.g., the received transmissions with the same block size). Therefore, the two or more uplink channel transmissions (e.g., PUSCH0 and PUSCH1) may carry a same data block with equal/corresponding transmission block size (TBS). For example, the PUSCHs of DCI0 (e.g., PUSCH0 and PUSCH1) may carry/include a data block with equal/corresponding TBS. The wireless communication node may receive/obtain the transmissions of DCI0 (or another scheduling grant) and perform soft combining.

In some embodiments, the wireless communication node may configure one or more repetitive transmissions. For example, TRP0 and TRP1 may each configure one or more PUSCH repetitive transmissions (e.g., repetition occasions). The wireless communication node may configure/adjust the number of repetitive transmissions to be large enough for a wireless communication device with inadequate channel conditions. The number of repetitive transmissions may be configured/determined for each scheduling grant (e.g., DCI). For example, a number of repetitive transmissions N0 may correspond to DCI0, while a number of repetitive transmissions N1 may correspond to DCI1. Therefore, the wireless communication device may transmit/send the same transmission block (TB) N0+N1 times. The values of N0 and N1 may be separate/distinct or equal. Referring now to FIG. 6, N0 and N1 may both have a value equal to two. Therefore, two repetitive transmissions may be configured for both DCI0 and DCI1. The wireless communication device may send/transmit the TB four times.

In some embodiments, one or more uplink channel transmissions may include/carry the same data block (e.g., the transmissions may have a corresponding/equal TBS). Two or more scheduling grants may be associated if they are used to schedule two or more uplink transmissions carrying/including the same data block. For example, DCI0 and DCI1 may be associated if they are used to schedule two PUSCHs that carry/include the same data block. The wireless communication node may inform/indicate/specify to the wireless communication device that two or more scheduling grants (e.g., DCI and/or higher layer configuration) are associated/ linked. For example, TRP0 and/or TRP1 may provide information to the UE 302 that indicates DCI0 and DCI1 are associated.

The wireless communication node may provide/specify the association information via an indicator, a scheduling grant, a message, a transmission, and/or other methods. For example, the wireless communication node may send/transmit two or more DCIs (e.g., DCI0 and DCI1) that carry/include a same/associated hybrid automatic repeat request (HARQ) processing number (or other indicator/number). Higher layer signaling (or other types of signaling) may configure and/or predetermine whether two or more HARQ processing numbers are associated. The wireless communication device may receive/obtain the two or more DCIs (or other scheduling grants) and may determine whether the corresponding HARQ numbers (or other indicators/numbers) are the same/associated. For example, UE 302 may receive DCI0 and DCI1, each including/carrying a HARQ processing number. The UE 302 may determine whether the HARQ number of DCI0 and the HARQ number of DCI1 are the same/associated. If the HARQ numbers are the same/associated, the wireless communication device may determine the two or more uplink transmissions (e.g., PUSCH0 and PUSCH1) that are scheduled with the DCIs are repetitive transmissions. Therefore, the wireless communication device may determine that the DCIs (e.g., DCI0 and DCI1) are associated. If the HARQ numbers are distinct/unequal, the wireless communication device may determine that the two or more uplink transmissions (e.g., PUSCH0 and PUSCH1) are distinct/independent (e.g., the DCIs are unassociated).

In some embodiments, the scheduling grants may be associated with distinct/separate control resource sets (CORESETs) and/or coresetPoolIndex-r16 (or other higher layer signaling parameters). The coresetPoolIndex-r16 may indicate/specify/provide the index of the CORESET pool. Two or more scheduling grants associated with separate CORESETs and/or coresetPoolIndex-r16 may include/indicate/specify the same HARQ processing number (e.g., the two or more scheduling grants may be associated). For example, DCI1 and DCI0 may carry/include the same HARQ number and each be associated with a separate CORESET. Therefore, DCI1 and DCI0 may be associated/linked (e.g., the DCIs carry/include the same HARQ number). In some embodiments, a new number indicator (NDI) may provide information indicating/specifying whether two or more scheduling grants are associated. For example, two DCIs (or other scheduling grants) that carry/include/specify the same NDI may be associated. In some embodiments, the wireless communication node may configure/activate/indicate independent/separate beams for each scheduling grant (e.g., DCI or higher layer configuration) to increase/improve beam diversity for physical downlink control channel (PDCCH) reliability.

In some embodiments, several uplink channel transmissions (e.g., PUSCH) that are scheduled according to the same scheduling grant may utilize or correspond to a same beam. For example, the PUSCH transmissions scheduled according to DCI0 may utilize or correspond to the same beam. A single beam may refer or correspond to a single transmission configuration indicator (TCI) state, a spatial relation information, a sounding reference signal resource indicator (SRI), or a quasi co-location (QCL) type D assumption. Uplink channel transmissions that utilize or correspond to the same beam may fail to provide fast beam diversity gain. For example, the wireless communication device may send/transmit PUSCH0 to the wireless communication node using DCI0. Once the wireless communication node receives/obtains PUSCH0, the wireless communication device may send/transmit PUSCH1 using DCI0 (e.g., utilizing the same beam). Once the wireless communication node receives/obtains PUSCH1, the wireless communication node may utilize other beams to receive/obtain other uplink transmissions. In some embodiments, a beam of the uplink transmission may experience blockage. For example, the beam utilized by PUSCH0 (e.g., beam 0) may be blocked/obstructed/occluded. Therefore, the wireless communication node may experience a delay in receiving/obtaining the transmissions of the blocked/obstructed/occluded beam.

Figure 7:
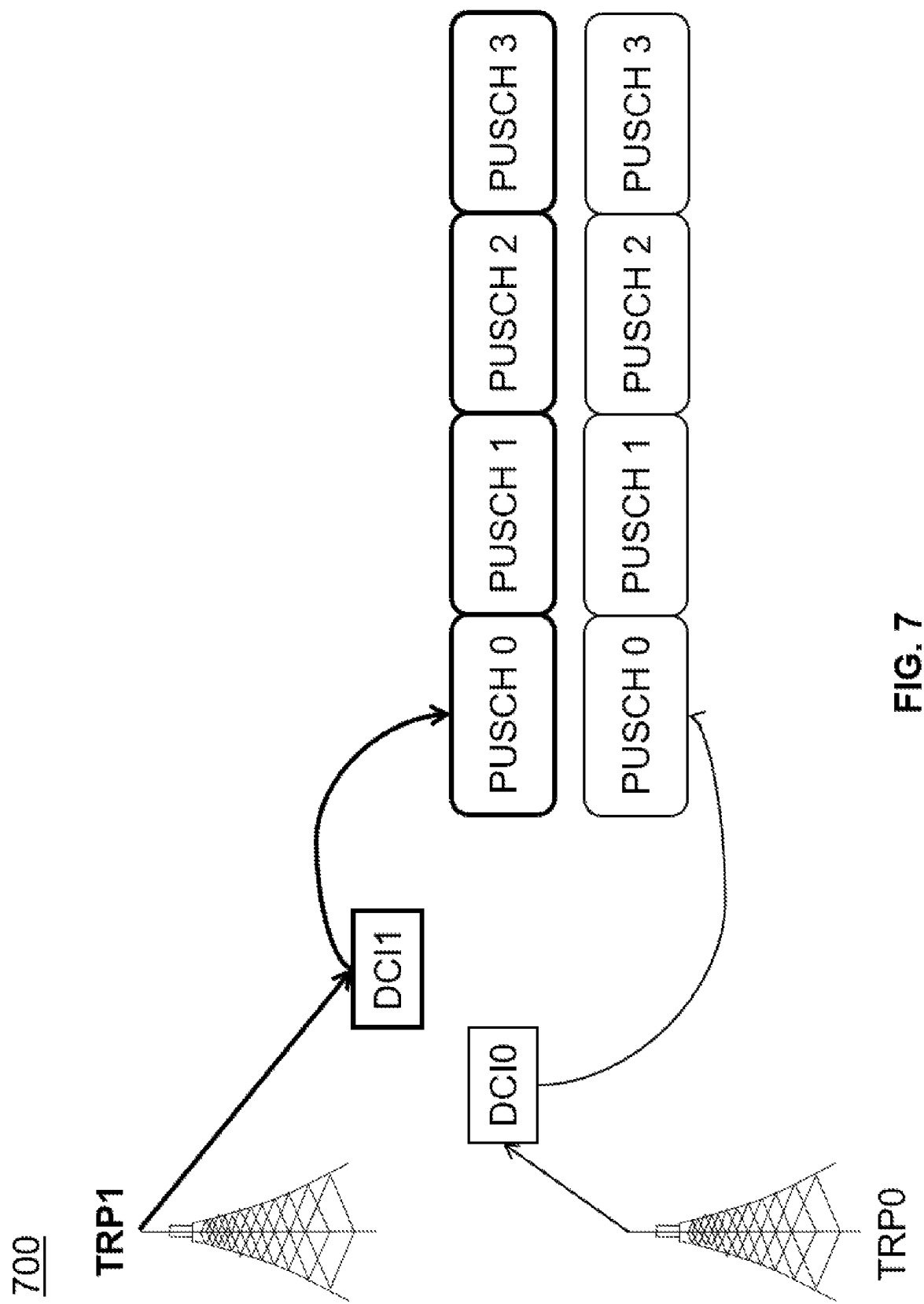
FIG. 7 illustrates example approaches for transmitting uplink data utilizing MTRP, two or more scheduling grants, and overlapping transmissions, in accordance with some embodiments of the present disclosure.

Referring now to FIG. 7 depicted is a representation 700 of an example uplink transmission with overlapping repetitive transmissions. In some embodiments, the wireless communication node may configure one or more overlapping uplink transmissions using two or more scheduling grants to achieve fast beam diversity gain. The overlapping uplink transmissions (e.g., PUSCH) may overlap in the time-domain. For example, TRP0 and TRP1 may each configure four repetitive PUSCH transmissions (e.g., PUSCH0, PUSCH1, PUSCH2, and PUSCH3) using DCI0 and DCI1 respectively. The repetitive PUSCH transmissions may overlap at least in the time-domain in the same BWP. For example, the PUSCH0 transmission of DCI1 may overlap with the PUSCH0 transmission of DCI0. The repetitive transmissions may contain/include a data block with equal/corresponding TBS. The overlapping uplink transmissions (e.g., PUSCH0, PUSCH1, PUSCH2, and PUSCH3) that are scheduled according to the same scheduling grant (e.g., DCI0 or DCI1) may utilize or correspond to the same beam.

Figure 8:
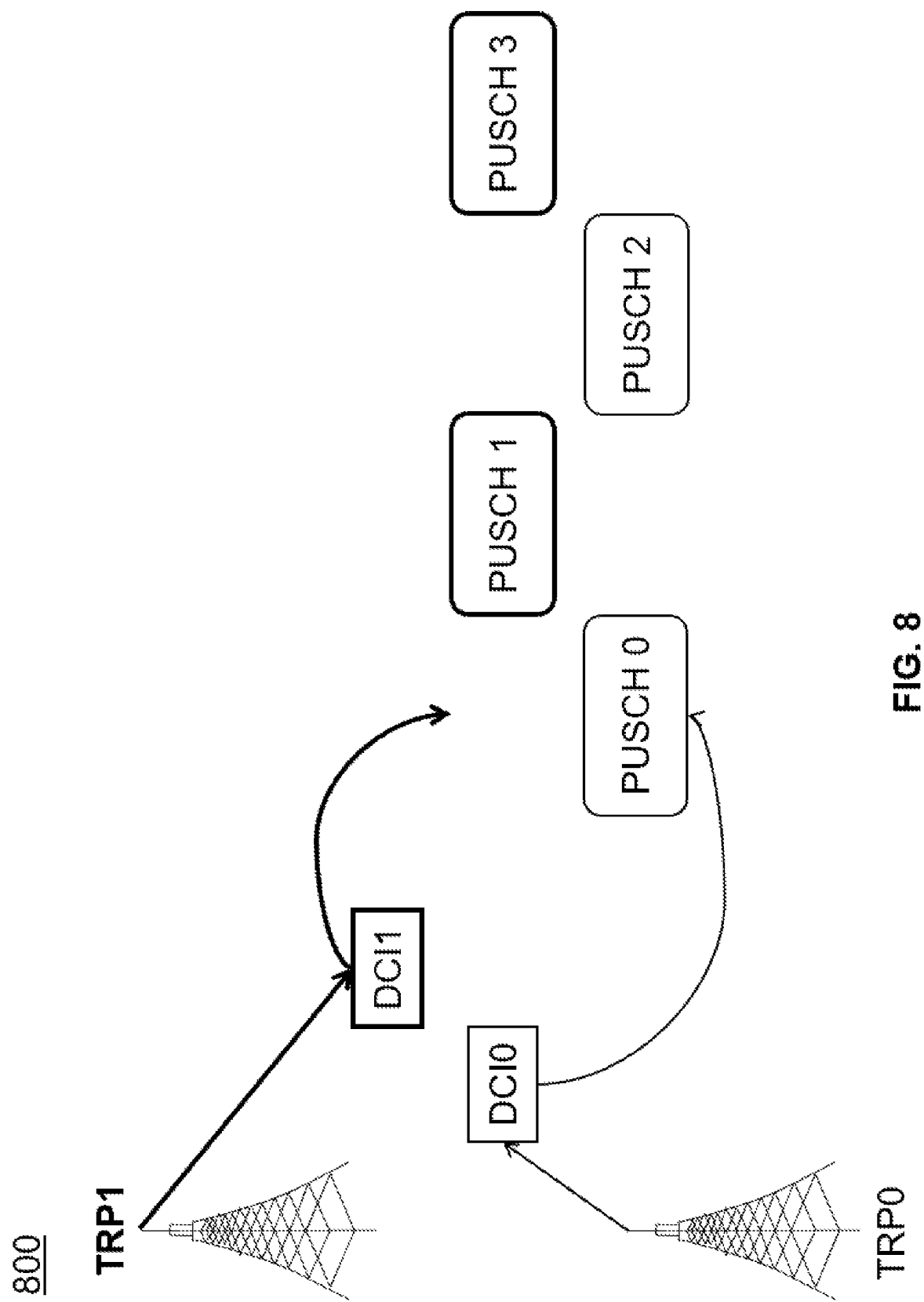
FIGS. 8-10 illustrate various approaches for transmitting uplink data utilizing MTRP, two or more scheduling grants, overlapping transmissions, and a drop rule, in accordance with some embodiments of the present disclosure.

Referring now to FIG. 8 depicted is a representation 800 of an example uplink transmission with overlapping repetitive transmissions that utilizes/implements a drop rule. In some embodiments, the wireless communication node and/or the wireless communication device may configure/define a drop rule to achieve fast beam diversity gain. The drop rule may comprise a rule or policy (e.g., executed by a policy engine of the wireless communication device for instance) for determining whether to drop/skip one or more repetitive uplink transmissions scheduled according to two or more scheduling grants (e.g., DCI or higher layer configuration). For example, the drop rule may be used to determine dropping/skipping the PUSCH0/PUSCH2 transmissions of DCI1 and the PUSCH1/PUSCH3 transmissions of DCI0. As a result, the PUSCH1/PUSCH3 transmissions of DCI1 and the PUSCH0/PUSCH2 transmissions of DCI0 may remain (e.g., at least one transmission of each corresponding PUSCH group may remain). The drop rule may be used to determine dropping/skipping the repetitive uplink transmissions sequentially. In some embodiments, the drop rule may follow a predetermined pattern/configuration to decide/determine which repetitive uplink transmissions to drop/skip. For example, the drop rule may indicate that a PUSCH repetition scheduled according to DCI0 is dropped/skipped initially. Following the initial PUSCH drop, the drop rule may specify that a PUSCH repetition scheduled according to DCI1 is dropped/skipped. The wireless communication device may continue to toggle/switch/cycle/alternate between scheduling grants to drop/skip repetitive transmissions.

Two or more scheduling grants may provide information to configure one or more repetitive uplink transmissions (e.g., PUSCH transmissions). The repetitive uplink transmissions that are scheduled according to the two or more scheduling grants may overlap at least in the time domain.

In some embodiments, the drop rule may indicate/specify that at least one of two or more overlapping repetitive uplink transmissions are to be dropped/skipped. Responsive to dropping/skipping at least one of each group of overlapping transmissions, the wireless communication system may achieve spatial (or beam) and/or time diversity over the retained uplink transmissions. For example, the wireless communication system may switch/toggle/cycle between two or more beams with each retained uplink transmission.

In some embodiments, certain (e.g., low cost) wireless communication devices may have/include/comprise one antenna panel. Therefore, low cost wireless communication devices for instance may support/enable one beam transmission and/or reception at a time. Such wireless communication devices may utilize/implement the systems and methods disclosed herein to increase beam diversity. For example, the wireless communication device may switch/toggle/cycle between two or more beams to receive/send downlink/uplink transmissions, hence increasing beam and/or time diversity.

Figure 9:
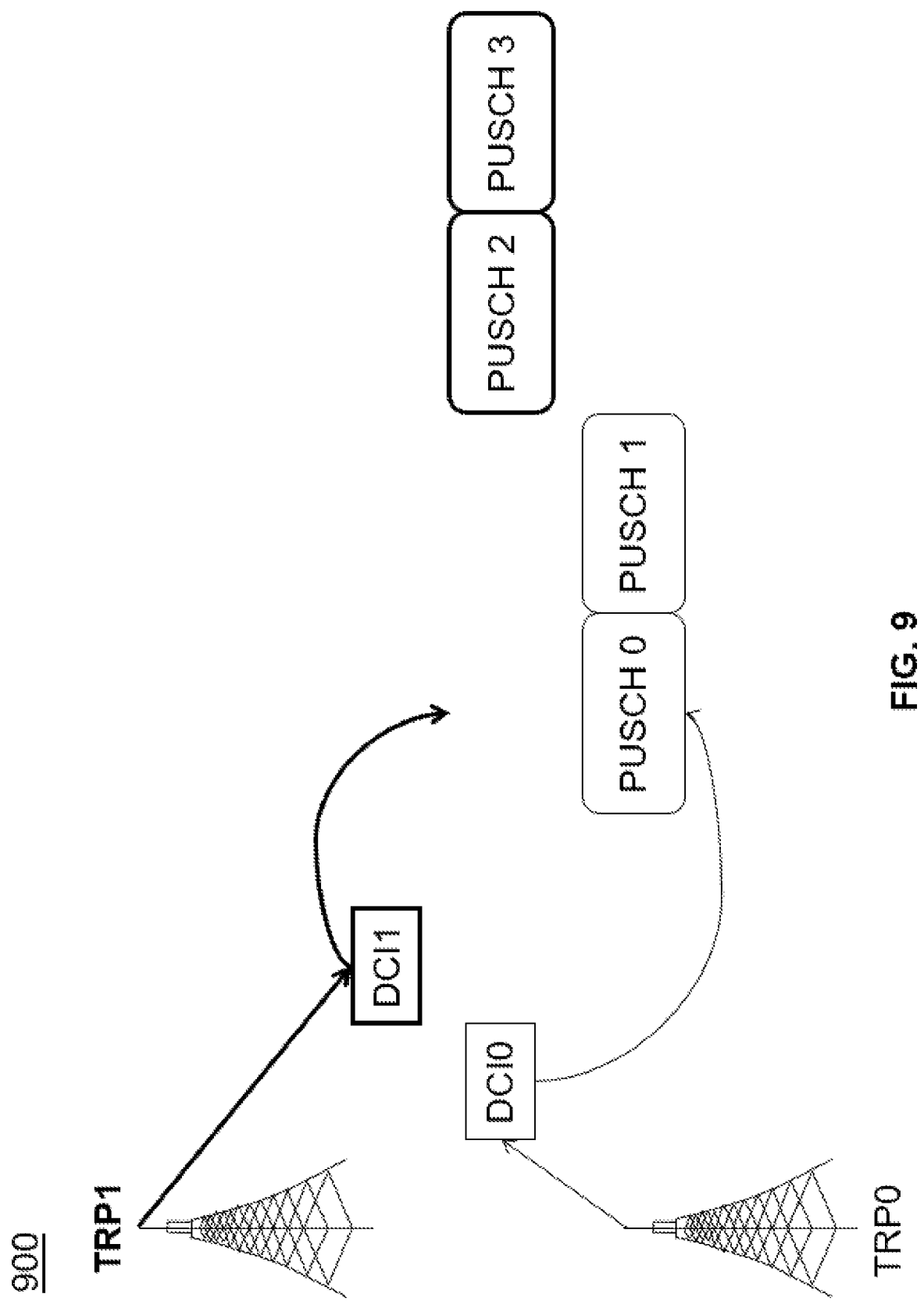

Referring now to FIG. 9 depicted is a representation 900 of an example uplink transmission with overlapping repetitive transmissions that utilizes/implements a drop rule. In some embodiments, the wireless communication device may drop/skip M1 (e.g., M1=2) repetitive transmissions (e.g., uplink and/or downlink) scheduled according to a first scheduling grant (e.g., DCI or higher layer configuration). Furthermore, the wireless communication device may drop/skip M2 repetitive transmissions (e.g., uplink and/or downlink) scheduled according to a second scheduling grant. The wireless communication device may continue to drop/skip repetitive transmissions scheduled using one or more scheduling grants. For example, the wireless communication device may drop/skip M1=2 repetitive transmissions scheduled according to DCI1. Furthermore, the wireless communication may drop/skip M2=2 repetitive transmissions scheduled according to DCI0. In some embodiments, the wireless communication device may drop the M2 repetitive transmissions responsive to dropping the M1 repetitive transmissions. In some embodiments, the wireless communication device may drop/skip M1 and/or M2 sequential repetitive transmissions. The wireless communication device and/or the wireless communication node may determine/configure the number of dropped repetitive transmissions (e.g., M1, M2, and/or other values). In some embodiments, the number of dropped repetitive transmissions (e.g., M1, M2, and/or other values) may be the same. In some embodiments, the number of dropped repetitive transmissions (e.g., M1, M2, and/or other values) may be separate/distinct from each other. The granularity of the number of dropped repetitive transmissions (e.g., M1, M2, and/or other values) may be defined/configured at the (transmission) occasion level (e.g., one or more PUSCH and/or PDSCH occasions, such as X consecutive occasions for dropping).

In some embodiments, the wireless communication device may switch/toggle/cycle between the one or more scheduling grants to drop/skip the repetitive transmissions (e.g., uplink or downlink). For example, the wireless communication may drop/skip M1 repetitive transmissions scheduled according to DCI1. Responsive to dropping the M1 transmissions, the wireless communication device may drop/skip M2 repetitive transmissions scheduled according to DCI0. The wireless communication device may continue to drop repetitive transmissions scheduled according to other DCIs (e.g., drop/skip M3 transmissions scheduled using DCI2) until repetitive transmissions are dropped/skipped from the one or more scheduling grants, or until there are no remaining overlapping repetitive transmissions.

Overlapping repetitive transmissions (e.g., PUSCHs, PDSCHs, or other transmissions) scheduled by using two or more scheduling grants (e.g., DCI or higher layer configurations) may overlap in the time domain within at least one bandwidth part (BWP), one component carrier, or one serving cell. For example, overlapping repetitive PUSCH transmissions scheduled by using DCI0 and DCI1 may overlap within at least one BWP. In some embodiments, the overlapping repetitive transmissions may overlap in the time and/or frequency domain (e.g., resource element (RE) level overlap).

In some embodiments, the granularity of the number of dropped (consecutive/adjacent) repetitive transmissions may be defined/configured at the slot level (e.g., one or more slots). For example, the wireless communication device may drop/skip one or more PUSCH or PDSCH occasions (e.g., that are consecutive/adjacent in the time domain) scheduled according to DCI1 in a first overlapping slot. Furthermore, the wireless communication device may drop/skip one or more consecutive/adjacent PUSCH or PDSCH occasions scheduled according to DCI0 in a second overlapping slot. The wireless communication device may proceed to drop/skip one or more consecutive/adjacent PUSCH or PDSCH occasions scheduled by using other DCIs in one or more overlapping slots. The drop rule may comprise a drop granularity of one or more slots. For example, the wireless communication device may drop/skip one or more PUSCHs or PDSCH occasions scheduled by using DCI1 in the first pair (or group comprising two or more slots) of overlapping slots. Furthermore, the wireless communication device may drop/skip one or more PUSCH or PDSCH occasions scheduled by using DCI0 in the second pair (or group comprising two or more slots) of overlapping slots.

Figure 10:
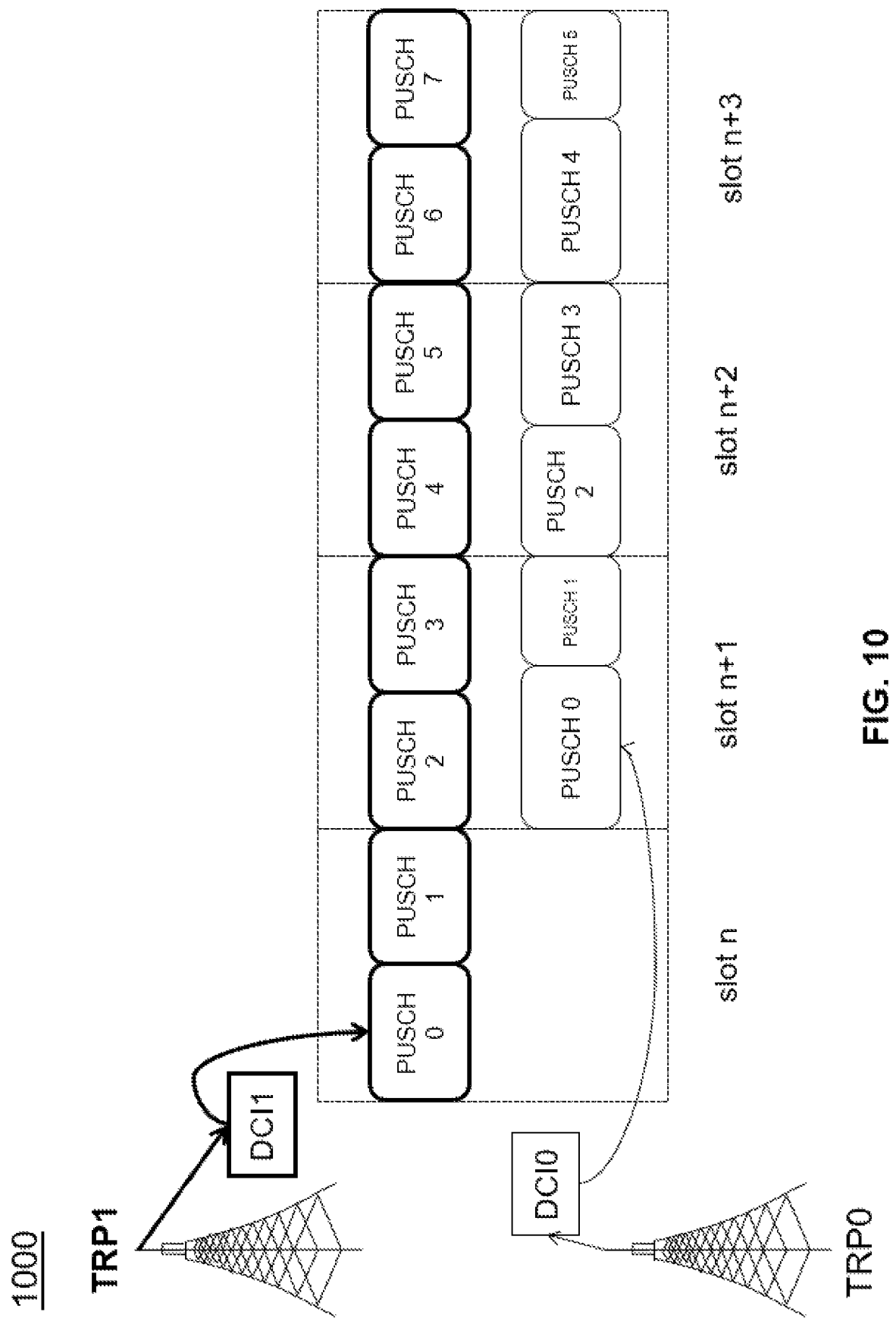

Referring now to FIG. 10 depicted is a representation 1000 of an example uplink transmission with overlapping repetitive transmissions that utilizes/implements a drop rule at the slot level. In some embodiments, one slot may comprise one or more PUSCH or PDSCH occasions. For example, slot n may include PUSCH0 and PUSCH1. The drop rule may comprise a drop granularity of one or more slots (e.g., slot level granularity). Two or more scheduling grants (e.g., two or more DCIs) may schedule partially overlapping data occasions (e.g., PUSCH and/or PDSCH occasions) to increase flexibility. Overlapping transmissions or occasions may comprise two or more transmissions or occasions scheduled by two or more scheduling grants that overlap in the time domain within at least on BWP, one component carrier, or one serving cell. Partially overlapping transmissions or occasions may comprise two or more transmissions or occasions scheduled by two or more scheduling grants that have a portion of overlapping symbols.

In some embodiments, the wireless communication node may transmit/send M scheduling grants (e.g., two scheduling grants) to the wireless communication device. Higher layer signaling (e.g., RRC signaling or MAC CE signaling) may predefine/configure the value of M, where the value is a positive integer number. The wireless communication device may receive/obtain the M scheduling grants to schedule one or more overlapping occasions or transmissions. The scheduled occasions may be divided/separated/organized into N groups (e.g., two groups). The wireless communication device may send/transmit the occasions within a single group according to one of the M scheduling grants (e.g., DCI0). M can be equal to N. For example, the wireless communication device may transmit the occasions within group 0 according to DCI0. In another example, the wireless communication device may transmit the occasions within group 1 according to DCI1. Higher layer signaling may predefine/configure the value of N, where the value is a positive integer number.

In some embodiments, each of the N groups may sequentially cycle to a next group to schedule one or more occasions of the N groups. At a time instance, only one repetitive transmission may remain within one group. Other repetitive transmissions may be dropped or skipped within the group.

Option 1: In some embodiments, each of the N groups of repetitive transmissions may cycle in every X number of time slots. Higher layer signaling may specify/predefine/configure the value of X, where the value is a positive integer number greater than or equal to 1. For example, a first group may include the repetitive transmissions of a first time domain unit, a $(N+1)^{th}$ time domain unit (if it exists), a $(2N+1)^{th}$ time domain unit (if exists), and the same mapping pattern continues to the remaining transmissions. In another example, a second group may include the repetitive transmissions of a second time domain unit, a $(N+2)^{th}$ time domain unit (if it exists), a $(2N+2)^{th}$ time domain unit (if exists), and the same mapping pattern continues to the remaining transmissions. The time domain unit may have a duration of X time slots.

If N=2 (e.g., the N groups comprise group 0 and group1) and X=1 (e.g., the number of time slots has a value of one), group 0 may include the repetitive transmissions of the even numbered overlapping time slots. In some embodiments, the first overlapping time slot may be an even numbered time slot. For example in FIG. 10, the first overlapping time slot (e.g., slot n+1) is an even numbered time slot. Therefore, group 0 may comprise the data occasions of the even numbered time slots (e.g., slot n+1 and slot n+3). In other words, group 0 may include the data occasions of the first and third (e.g., N+1) overlapping time slots. In this example, group 1 may include the data occasions of the odd numbered overlapping time slots (e.g., n+2). Therefore, group 1 may include the data occasions of the second overlapping time slot.

If N=2 (e.g., the N groups comprise group 0 and group1) and X=2 (e.g., the number of time slots has a value of two), group 0 may include the repetitive transmissions of slots n+1 and n+2. For example in FIG. 10, group 0 may include the data occasions of the first overlapping time slot and the following time slot (e.g., two time slots). In this example, group 1 may include the data occasions of slot n+3. Therefore, group 1 may include the data occasions of the first set of overlapping time slots following the first set of two overlapping time slots (e.g., slot n+1 and slot n+2).

Option 2: In some embodiments, each of the N groups of repetitive transmissions may cycle in every X number of occasions of the repetitive transmissions in the time domain. Higher layer signaling may specify/predefine/configure the value of X, where the value is a positive integer number greater than or equal to 1. For example, a first group may include the repetitive transmissions of a first time domain unit, a $(N+1)^{th}$ time domain unit (if it exists), a $(2N+1)^{th}$ time domain unit (if exists), and so on. In another example, a second group may include the repetitive transmissions of a second time domain unit, a $(N+2)^{th}$ time domain unit (if it exists), a $(2N+2)^{th}$ time domain unit (if exists), and so on. The time domain unit may have a duration of X occasions of repetitive transmissions in the time domain.

If N=2 (e.g., the N groups comprise group 0 and group1) and X=1 (e.g., the number of occasions of the repetitive transmissions has a value of one), group 0 may include occasions PUSCH0 and PUSCH2 scheduled by DCI0 and DCI1 as shown in FIG. 7. Therefore, group 0 may comprise the first and third occasions scheduled by DCI0 and DCI1. In this example, group 1 may include occasions PUSCH1 and PUSCH3 scheduled by DCI0 and DCI1. Therefore, group 1 may comprise the second and fourth occasions scheduled by DCI0 and DCI1.

If the transmissions are downlink channel transmissions (e.g., PDSCH transmissions), an existing RRC parameter CycMapping (or other parameters) may indicate/specify that X has a value of one (or other values). If the transmissions are downlink channel transmissions (e.g., PDSCH transmissions), an existing RRC parameter SeqMapping (or other parameters) may indicate/specify that X has a value of two (or other values). In some embodiments, each of the N groups of repetitive transmissions may correspond to a respective one of the M scheduling grants. For example, the $i^{th}$ group of the N groups may correspond to the $i^{th}$ DCI. In another example, if N has a value of 2, group 0 may correspond to DCI0 and group 1 may correspond to DCI1.

In the $i^{th}$ group of the N groups, the wireless communication device may send and/or receive the repetitive transmissions scheduled according to the $i^{th}$ scheduling grant. For example, if N has a value of two (e.g., two groups), the wireless communication device may send/transmit the repetitive transmissions of group 0 scheduled according to DCI0. The wireless communication device may fail to transmit/send the repetitive transmissions of group 0 (e.g., PUSCHs of group 0) scheduled according to DCI1. In the same example, the wireless communication device may send/transmit the repetitive transmissions of group 1 (e.g., PUSCHs of group 1) scheduled according to DCI1. The wireless communication device may fail to send/transmit the repetitive transmissions of group 1 scheduled according to DCI0. In some embodiments, i is a positive number with a value smaller than or equal to the value of N.

In the $i^{th}$ group of the N groups, the wireless communication device may send and/or receive the repetitive transmissions scheduled according to the $j^{th}$ scheduling grant. In some embodiments, j is a positive number with a value that is unequal to the value of i. For example, if N has a value of two (e.g., two groups), the wireless communication device may send/transmit the repetitive transmissions of group 0 scheduled according to DCI1. The wireless communication device may fail to transmit/send the repetitive transmissions of group 0 (e.g., PUSCHs of group 0) scheduled according to DCI0. In the same example, the wireless communication device may send/transmit the repetitive transmissions of group 1 (e.g., PUSCHs of group 1) scheduled according to DCI0. The wireless communication device may fail to send/transmit the repetitive transmissions of group 1 scheduled according to DCI1.

In some embodiments, each of the M scheduling grants may be associated/related with a corresponding control resource set (CORESET) pool identifier/number/value. For example, TRP0 and TRP1 may send/transmit DCI0 and DCI1 respectively. Each of the DCIs (e.g., DCI0 and DCI1) may be associated/related with a corresponding CORESET pool identifier. For instance, DCI0 and DCI1 may be associated with coresetPoolIndex-r16 values of zero and one respectively (or other values). In another example, DCI0 and DC1 may be associated with coresetPoolIndex-r16 values of one and zero respectively (or other values).

In some embodiments, each of the M scheduling grants may be associated with a corresponding CORESET identifier/number/value. For example, two DCIs (e.g., DCI0 and DCI1) may each be associated with independent/separate CORESET identifiers. One of the two DCIs (e.g., DCI0) may be associated with smaller values of the CORESET identifier. The other DCI (e.g., DCI1) may be associated with larger values of the CORESET identifier. In another example, DCI0 may be associated with larger values of the CORESET identifier. The other DCI (e.g., DCI1) may be associated with smaller values of the CORESET identifier.

In some embodiments, each of the M scheduling grants may have a corresponding time location and/or a corresponding occasion of a repetitive transmission scheduled by the scheduling grant (e.g., DCI or higher layer configuration). The corresponding time location and/or occasion of a repetitive transmission may determine/specify/indicate the identity of the scheduling grants (e.g., determine which of two DCIs is DCI0 and which is DCI1). For example, the wireless communication node may send/transmit two DCIs. The corresponding time location and/or occasion of a repetitive transmission may determine/specify the identity of each of the two DCIs. For example, the wireless communication node may send/transmit DCI0 before or after transmitting DCI1. In another example, the first symbol of DCI0 or DCI1 may occur before the first symbol of DCI1 or DCI0. In another example, the last symbol of DCI0 or DCI1 may occur before the last symbol of DCI1 or DCI0.

In some embodiments, the first symbol of one or more uplink (or downlink) channel occasions scheduled by DCI0 may occur before or after the first symbol of one or more uplink (or downlink) channel occasions scheduled by DCI1. In another example, the last symbol of one or more uplink (or downlink) channel occasions scheduled by DCI0 may occur before or after the last symbol of one or more uplink (or downlink) channel occasions scheduled by DCI1.

Using FIG. 10 as an example, M and N may each have a value of two (e.g., two scheduling grants and two groups), while X may have a value of one (e.g., one time slot or one occasion). In this example, DCI0 and DCI1 may each be associated with coresetPoolIndex-r16 values (e.g., corresponding to a CORESET pool index) of zero and one respectively. The first group (e.g., group 0) may comprise the occasions included in slots n+1 and n+3. In the first group, the wireless communication device may transmit or receive the data occasions scheduled according to the corresponding scheduling grant (e.g., DCI0). The second group (e.g., DCI1) may comprise the occasions included in slot n+2. In the second group, the wireless communication device may transmit or receive the occasions scheduled according to the corresponding scheduling grant (e.g., DCI1). Because the occasions (e.g., PUSCH or PDSCH occasions) are scheduled according to two or more scheduling grants, the uplink and/or downlink transmissions may use two or more separate beams. Therefore, the wireless communication device may achieve fast beam diversity gain.

In the aforementioned example, DCI0 and DCI1 may schedule repetitive uplink (e.g., PUSCH) or downlink (e.g., PDSCH) transmissions of the same transmission block (TB). Therefore, DCI0 and DCI1 may be associated with each other. If two or more wireless communication nodes (e.g., TRPs) receive or transmit at least one PUSCH or PDSCH occasion, the transmission of the TB may be successful/complete.

The DCI may be used to schedule an uplink channel transmission (e.g., PUSCH). In some embodiments, a RRC configuration (or RRC signal) may determine, indicate and/or specify the scheduling of semi-persistent uplink channel transmissions (e.g., semi-persistent PUSCH occasions). Therefore, the systems and methods disclosed herein may be utilized for PUSCH transmissions that are scheduled using RRC configuration. In some embodiments, the RRC configuration may replace/substitute the DCI. Independent/separate beams may configure, activate, and/or indicate the PUSCHs transmissions that are scheduled using at least two grants (e.g., DCI and/or RRC configuration).

Figure 11:
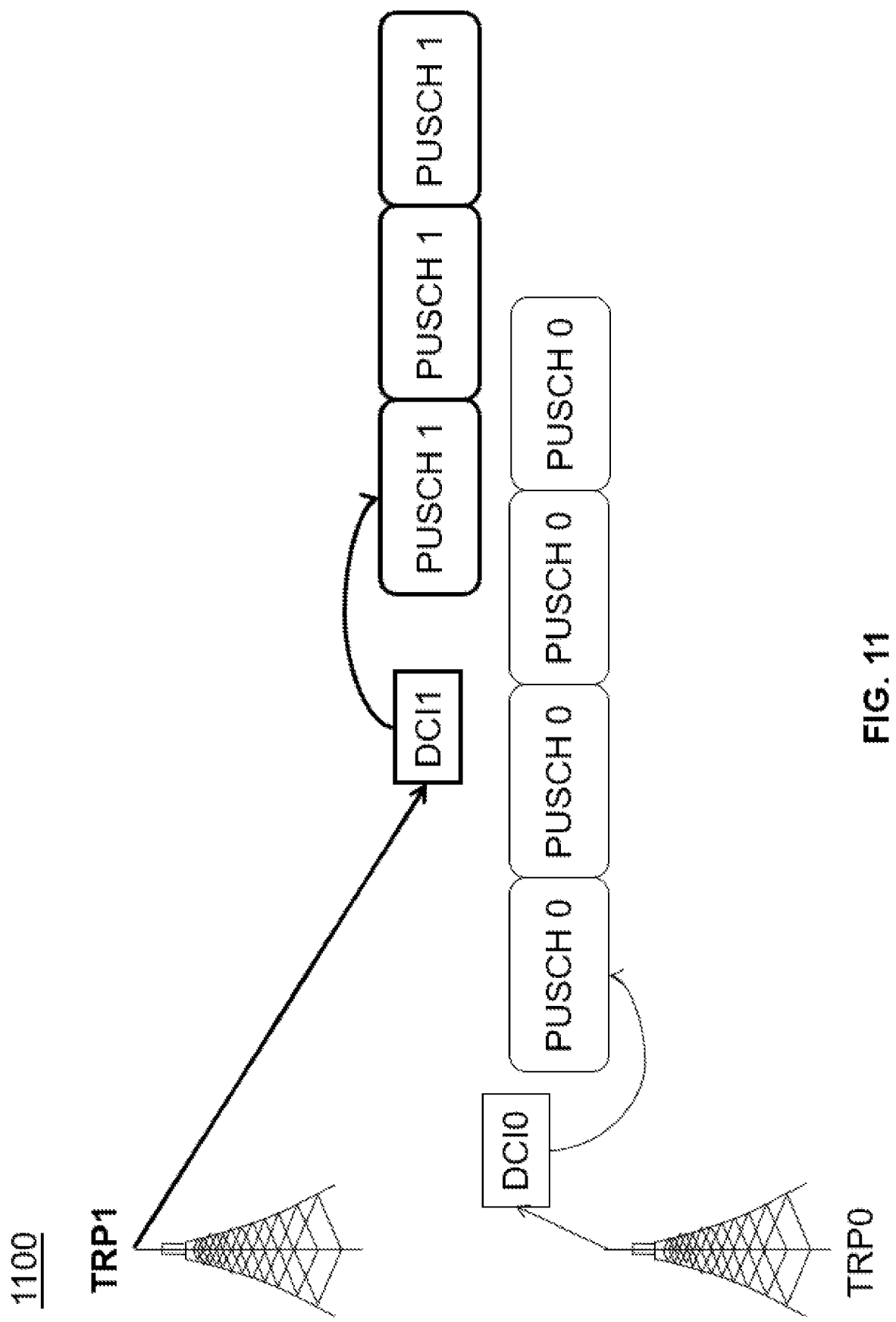
FIG. 11 illustrates example approaches for transmitting uplink data utilizing MTRP, two or more scheduling grants, and partially overlapping transmissions, in accordance with some embodiments of the present disclosure.

Referring now to FIG. 11 depicted is a representation 1100 of an example uplink transmission with partially overlapping repetitive transmissions. In some embodiments, the wireless communication node may schedule partially overlapping uplink (e.g., PUSCH) and/or downlink (e.g., PDSCH) transmissions using two or more scheduling grants (e.g., DCI or higher layer configuration). For example, responsive to sending/transmitting DCI0, the wireless communication node may fail to receive/obtain the PUSCH0 and PUSCH1 transmissions corresponding to DCI0. The wireless communication node may determine that the beam corresponding to the PUSCH transmissions is blocked/obstructed. Therefore, the wireless communication node may determine that the wireless communication device may fail to send/transmit the remaining transmissions (e.g., PUSCH2 and PUSCH3). Responsive to the determination, the wireless communication node may transmit DCI1 to schedule the corresponding transmissions (e.g., PUSCH0, PUSCH1, and PUSCH2) using another beam. Among the overlapping transmissions, the transmissions that are scheduled according to DCI1 may have a higher priority than the transmissions that are scheduled according to DCI0 (e.g., DCI1 is transmitted after DCI0). Therefore, the wireless communication device may fail to transmit the overlapping transmissions scheduled according to DCI0 (e.g., PUSCH2 and PUSCH3). The wireless communication device may transmit the PUSCH0 and PUSCH1 transmissions corresponding to DCI1 during the time interval the overlap takes place (e.g., the overlap time). During the overlap time, the wireless communication device may send/transmit a single data transmission corresponding to a single scheduling grant. The wireless communication device may transmit the single data transmission corresponding to the most recent scheduling grant (e.g., DCI1).

In some embodiments, the wireless communication device may transmit the repetitive transmissions (e.g., PUSCH repetitions) corresponding to DCI1 during the overlap time. The wireless communication device may drop or skip the repetitive transmissions (e.g., PUSCH repetitions) corresponding to DCI0 during the overlap time. A CORESET pool index, a CORESET identifier, a time location of the scheduling grant, and/or a corresponding occasion scheduled by the scheduling grant may be used to identify the two or more scheduling grants (e.g., DCI0 and DCI1).

In some embodiments, the wireless communication device may transmit the repetitive transmissions (e.g., PUSCH repetitions) corresponding to DCI0 during the overlap time. The wireless communication device may drop or skip the repetitive transmissions (e.g., PUSCH repetitions) corresponding to DCI1 during the overlap time. A CORESET pool index, a CORESET identifier, a time location of the scheduling grant, and/or a corresponding occasion scheduled by the scheduling grant may be used to identify the two or more scheduling grants (e.g., DCI0 and DCI1). In the aforementioned examples, if the wireless communication device transmits more than two DCIs, DCI0 may correspond to the first DCI and DCI1 may correspond to the last DCI.

In some embodiments, the above mentioned repetitive transmissions can be PUCCH transmissions and/or PDCCH transmissions. The same solutions can be used for PUCCH and PDCCH. Therefore, N repetitive transmissions may refer to N repetitive transmissions of a same information carried on PUCCH or PDCCH.

Figure 12:
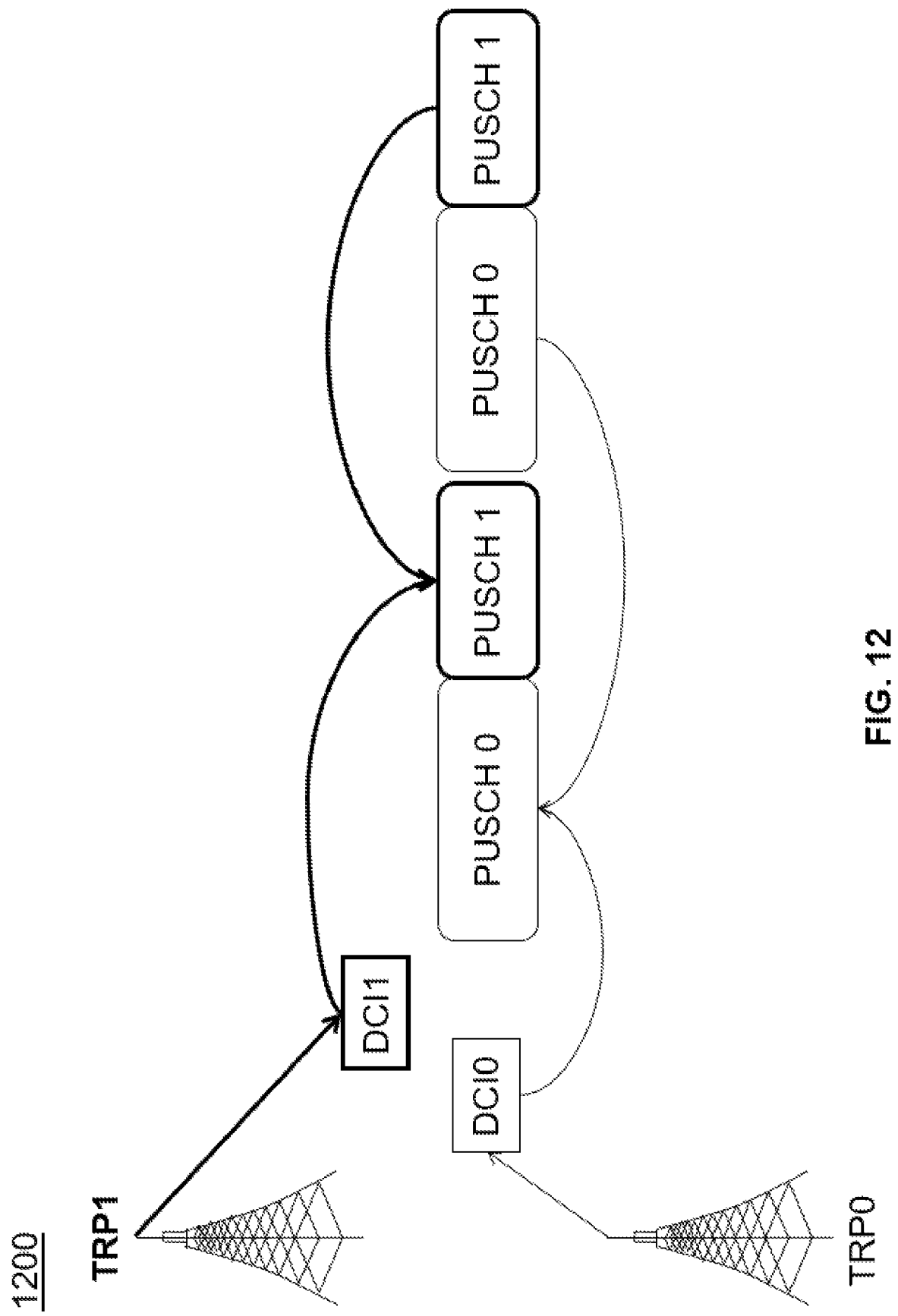
FIG. 12 illustrates example approaches for transmitting uplink data utilizing MTRP, two or more scheduling grants, and a distributed pattern, in accordance with some embodiments of the present disclosure.

Referring now to FIG. 12 depicted is a representation 1200 of an example uplink transmission with a distributed pattern. In some embodiments, each of two or more scheduling grants may provide information to configure distributed uplink/downlink patterns. The RRC and/or the time domain resource assignment (TDRA) of the scheduling grant (e.g., DCI) may indicate/specify the distributed pattern. For example, a number of K slot intervals may be configured between two PUSCH/PDSCH slots of each TRP. The value of K may be a positive integer number that is greater than or equal to one. For instance, if K has a value of two, the interval between two PUSCH occasions of each TRP may comprise two slots (instead of a larger number of slots). Therefore, configuring a distributed pattern may achieve fast beam diversity gain. The configured distributed pattern may cause an increased delay if a single TRP is used and K is configured using RRC signaling.

A. Methods of Improving Fast Beam Diversity

FIG. 13 illustrates a flow diagram of a method 380 of improving fast beam diversity. The method 380 may be implemented using any of the components and devices detailed herein in conjunction with FIGS. 1-12. In overview, the method 380 may include receiving N scheduling grants (382). The method 380 may include communicating one of two repetitive transmissions (384).

Referring now to operation (382), and in some embodiments, a wireless communication device (e.g., a UE or terminal) may receive/obtain N scheduling grants. In some embodiments, the wireless communication node (e.g., a TRP, base station or gNB) may send/transmit the N scheduling grants. The scheduling grants may comprise DCI, a higher layer configuration (e.g., RRC signaling, MACCE signaling, or other types of signaling), and/or other types of grants. The value of N may be greater than or equal to two. For example, a TRP may send/transmit two DCIs (e.g., DCI0 and DCI1) to a wireless communication device (e.g., UE). The wireless communication device may receive/obtain the two DCIs. The wireless communication device and/or wireless communication node may utilize the N scheduling grants to schedule a plurality of repetitive transmissions (e.g., uplink or downlink) of a same data block. For example, responsive to receiving the two DCIs, the wireless communication device may utilize the DCIs to schedule one or more PUSCHs (e.g., PUSCH0, PUSCH1, and/or other PUSCHs). The DCI0 may be used to schedule PUSCH0, PUSCH1, and/or other PUSCHs. The DCI1 may be used to schedule PUSCH0, PUSCH1, and/or other PUSCHs. The PUSCHs (PUSCH occasions) may carry/include the same data block (e.g., may be repetitive transmissions). At least two of the repetitive transmissions may overlap at a time instance. For example, PUSCH0 and PUSCH1 of the DCI0 may overlap with PUSCH0 and PUSCH1 of DCI1.

The plurality of repetitive transmissions (e.g., uplink or downlink) may comprise N groups of repetitive transmissions. For example, PUSCH0, PUSCH1, PUSCH2, and PUSCH3 may comprise two groups of repetitive transmissions. In another example, PDSCH0, PDSCH1, PDSCH2, and PDSCH3 may comprise two groups of repetitive transmissions. Higher layer signaling may specify/predefine/configure the value of N, where the value is a positive integer number. In some embodiments, each of the repetitive transmissions may be located in one of a plurality of time domain units. For example, each of the repetitive transmissions (e.g., PUSCH0, PUSCH1, 2 and PUSCH3) may be located in one of five (or other number) of time slots.

The number of time domain units may be a positive integer number that is greater than or equal to two. A first of the N groups may include repetitive transmissions in at least a first time domain unit, a $(N+1)^{th}$ time domain unit if the $(N+1)^{th}$ time domain unit exists, and a $(2N+1)^{th}$ time domain unit of the plurality of time domain units if the $(2N+1)^{th}$ time domain unit exists. For example, if N has a value of two (e.g., two groups), a first group may include the repetitive transmissions in even numbered time domain units. A second of the N groups may include repetitive transmissions in at least a second time domain unit, a $(N+2)^{th}$ time domain unit if the $(N+2)^{th}$ time domain unit exists, and a $(2N+2)^{th}$ time domain unit of the plurality of time domain units if the $(2N+2)$th time domain unit exists. For example, if N has a value of two (e.g., two groups), a second group may include the repetitive transmissions in odd numbered time domain units. Each of the plurality of time domain units may have a duration of X time slots, where X is greater than or equal to 1. For example, if X has a value of two (e.g., two time slots), a first group may include the repetitive transmissions in at least the first two time slots.

In some embodiments, each of the plurality of time domain units may have a duration of X occasions of repetitive transmissions in time domain, where X is greater than or equal to 1. For example, if X has a value of two (e.g., two occasions of repetitive transmissions), a first group may include the first two occasions of repetitive transmission in the time domain. Higher layer signaling may predefine/configure the value of X, where the value is a positive integer number greater than or equal to 1. If the transmissions are downlink channel transmissions (e.g., PDSCH transmissions), an existing RRC parameter CycMapping (or other parameters) may indicate/specify that X has a value of one (or other values). If the transmissions are downlink channel transmissions (e.g., PDSCH transmissions), an existing RRC parameter SeqMapping (or other parameters) may indicate/specify that X has a value of two (or other values).

In some embodiments, an n-th (or $n^{th}$) group of the N groups may correspond to an n-th scheduling grant of the N scheduling grants. For example, if N has a value of two (e.g., two groups) the first group of the two groups may correspond to the first DCI (e.g., DCI0) of the two DCIs (e.g., DCI0 and DCI1). The second group of the two groups may correspond to the second DCI (e.g., DCI1) of the two DCIs (e.g., DCI0 and DCI1). In the n-th group of the N groups, only repetitive transmissions scheduled by the n-th scheduling grant may be communicated between the wireless communication device and the wireless communication node. For example, if N has a value of two (e.g., two groups), the wireless communication node may send/transmit the repetitive transmissions of a first group (e.g., group 0) scheduled according to a first DCI (e.g., DCI0). In the same example, the wireless communication node may send/transmit the repetitive transmissions of a second group (e.g., PDSCHs of group 1) scheduled according to a second DCI (e.g., DCI1).

In some embodiments, an n-th scheduling grant and a (n+1)-th (or $(n+1)^{th}$) scheduling grant of the N scheduling grants may be associated with at least one of a plurality of identifiers and/or time locations. The plurality of identifiers may comprise different corresponding control resource set (CORESET) pool identifiers and/or (CORESET) identifiers. The plurality of time locations may comprise a different time location for each of the n-th scheduling grant and the (n+1)-th scheduling grant and/or a different time location for a first or last repetitive transmission scheduled by each of the n-th scheduling grant and the (n+1)-th scheduling grant. For example, a first and second DCI (e.g., DCI0 and DCI1) of two DCIs may each be associated with a separate/distinct CORESET pool identifier and/or a corset identifier. In another example, a first and second DCI (e.g., DCI0 and DCI1) of two DCIs may each be associated with a separate/distinct time location for each of the first and second DCI. In some embodiments, the n-th scheduling grant may be configured with a CORESET pool identifier or CORESET identifier of smaller value than that of the (n+1)-th scheduling grant. For example, the first DCI (e.g., DCI0) may be configured with a coresetPoolIndex-r16 value of zero (or other value smaller than that of the second DCI). The second DCI (e.g., DCI0) may be configured with a coresetPoolIndex-r16 value of one (or other value).

In some embodiments, the n-th scheduling grant may occur before or after the (n+1)-th scheduling grant. For example, the first DCI (e.g., DCI0) may occur before (or after) the second DCI (e.g., DCI1). In some embodiments, a first symbol of the n-th scheduling grant may occur before or after a first symbol of the (n+1)-th scheduling grant. For example, the first symbol of the first DCI (e.g., DCI0) may occur before (or after) the first symbol of the second DCI (e.g., DCI1). In some embodiments, a last symbol of the n-th scheduling grant may occur before or after a last symbol of the (n+1)-th scheduling grant. For example, a last symbol of the first DCI (e.g., DI0) may occur before (or after) a last symbol of the second DCI (e.g., DCI1). In some embodiments, a first symbol of repetitive transmissions scheduled by the n-th scheduling grant may occur before or after a first symbol of repetitive transmissions scheduled by the (n+1)-th scheduling grant. For example, a first symbol of repetitive PUSCH transmissions scheduled by the first DCI (e.g., DI0) may occur before (or after) a first symbol of repetitive PUSCH transmissions scheduled by the second DCI (e.g., DCI1). In some embodiments, a last symbol of repetitive transmissions scheduled by the n-th scheduling grant may occur before or after a last symbol of repetitive transmissions scheduled by the (n+1)-th scheduling grant. For example, a last symbol of repetitive PUSCH transmissions scheduled by the first DCI (e.g., DI0) may occur before (or after) a last symbol of repetitive PUSCH transmissions scheduled by the second DCI (e.g., DCI1).

Referring now to operation (384), and in some embodiments, the wireless communication device and the wireless communication node may communicate only one of at least two repetitive transmissions. For example, the wireless communication node may send/transmit only one of two or more repetitive PUSCHs. The at least two repetitive transmissions may overlap at the time instance. In some embodiments, the wireless communication device and the wireless communication node may communicate only one of the at least two repetitive transmissions that is scheduled by a first or Nth one of the N scheduling grants. For example, the wireless communication node may send/transmit only one of at least two repetitive PDSCH transmissions that is scheduled by a first DCI (e.g., DCI0). In another example, the wireless communication device may send/transmit only one of at least two repetitive PDSCH transmissions that is scheduled by using the second DCI (e.g., DCI1) of two DCIs. The first and second DCIs may be associated with different corresponding CORESET pool identifiers. In some embodiments, the at least two of the repetitive transmissions may overlap at least in time domain within one bandwidth part (BWP). Each of the at least two of the repetitive transmissions may be scheduled by a different one of the M scheduling grants. The at least two of the repetitive transmissions may overlap in a same resource element.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   receiving, by a wireless communication device from a wireless communication node, N scheduling grants to schedule a plurality of repetitive transmissions of a same data block, wherein at least two of the repetitive transmissions overlap at a time instance, and N is greater than or equal to 2, wherein the N scheduling grants are associated with at least one identifier corresponding to at least one control resource set (CORESET), wherein the plurality of repetitive transmissions comprises N groups of repetitive transmissions, and each of the repetitive transmissions is located in one of a plurality of time domain units, and a first of the N groups includes repetitive transmissions in at least a first time domain unit, a (N+1)th time domain unit if the (N+1)th time domain unit exists, and a (2N+1)th time domain unit of the plurality of time domain units if the (2N+1)th time domain unit exists, and a second of the N groups includes repetitive transmissions in at least a second time domain unit, a (N+2)th time domain unit if the (N+2)th time domain unit exists, and a (2N+2)th time domain unit of the plurality of time domain units if the (2N+2)th time domain unit exists; and
   communicating, between the wireless communication device and the wireless communication node, only one of the at least two repetitive transmissions that overlap at the time instance.

2. The method of claim 1, wherein each of the plurality of time domain units has a duration of X time slots, where X is greater than or equal to 1.

3. The method of claim 1, wherein each of the plurality of time domain units has a duration of X occasions of repetitive transmissions in time domain, where X is greater than or equal to 1.

4. The method of claim 1, wherein
   an n-th group of the N groups corresponds to an n-th scheduling grant of the N scheduling grants, and
   in the n-th group of the N groups, only repetitive transmissions scheduled by the n-th scheduling grant are communicated between the wireless communication device and the wireless communication node.

5. The method of claim 1, wherein an n-th scheduling grant and a (n+1)-th scheduling grant of the N scheduling grants are associated with at least one of:
   different corresponding CORESET pool identifiers,
   different corresponding CORESET identifiers,
   a different time location for each of the n-th scheduling grant and the (n+1)-th scheduling grant, or
   a different time location for a first or last repetitive transmission scheduled by each of the n-th scheduling grant and the (n+1)-th scheduling grant.

6. The method of claim 5, wherein the n-th scheduling grant is configured with a CORESET pool identifier or CORESET identifier of smaller value than that of the (n+1)-th scheduling grant.

7. The method of claim 5, wherein at least one of:
   the n-th scheduling grant occurs before the (n+1)-th scheduling grant,
   the n-th scheduling grant occurs after the (n+1)-th scheduling grant,
   a first symbol of the n-th scheduling grant occurs before a first symbol of the (n+1)-th scheduling grant, a first symbol of the n-th scheduling grant occurs after a
first symbol of the (n+1)-th scheduling grant,
a last symbol of the n-th scheduling grant occurs before a
last symbol of the (n+1)-th scheduling grant,
a last symbol of the n-th scheduling grant occurs after a
last symbol of the (n+1)-th scheduling grant,
a first symbol of repetitive transmissions scheduled by the
n-th scheduling grant occurs before a first symbol of
repetitive transmissions scheduled by the (n+1)-th
scheduling grant,
a first symbol of repetitive transmissions scheduled by the
n-th scheduling grant occurs after a first symbol of
repetitive transmissions scheduled by the (n+1)-th
scheduling grant,
a last symbol of repetitive transmissions scheduled by the
n-th scheduling grant occurs before a last symbol of
repetitive transmissions scheduled by the (n+1)-th
scheduling grant, or
a last symbol of repetitive transmissions scheduled by the
n-th scheduling grant occurs after a last symbol of
repetitive transmissions scheduled by the (n+1)-th
scheduling grant.

8. The method of claim 5, comprising:
communicating, between the wireless communication
device and the wireless communication node, only one
of the at least two repetitive transmissions that overlap,
that is scheduled by a first or Nth one of the N
scheduling grants.

9. The method of claim 1, wherein the at least two of the
repetitive transmissions overlap at least in time domain
within one bandwidth part (BWP), and each of the at least
two of the repetitive transmissions is scheduled by a different one of the M scheduling grants.

10. The method of claim 9, wherein the at least two of the
repetitive transmissions overlap in a same resource element.

11. A wireless communication device comprising:
at least one processor configured to:
receive, via a transceiver from a wireless communication node, N scheduling grants to schedule a plurality
of repetitive transmissions of a same data block,
wherein at least two of the repetitive transmissions
overlap at a time instance, and N is greater than or
equal to 2, wherein the N scheduling grants are
associated with at least one identifier corresponding
to at least one control resource set (CORESET),
wherein the plurality of repetitive transmissions
comprises N groups of repetitive transmissions, and
each of the repetitive transmissions is located in one
of a plurality of time domain units, and a first of the
N groups includes repetitive transmissions in at least
a first time domain unit, a (N+1)th time domain unit
if the (N+1)th time domain unit exists, and a (2N+
1)th time domain unit of the plurality of time domain
units if the (2N+1)th time domain unit exists, and a
second of the N groups includes repetitive transmissions in at least a second time domain unit, a (N+2)th
time domain unit if the (N+2)th time domain unit
exists, and a (2N+2)th time domain unit of the
plurality of time domain units if the (2N+2)th time
domain unit exists; and
communicate, via the transceiver between the wireless
communication device and the wireless communication node, only one of the at least two repetitive
transmissions that overlap at the time instance.

12. The wireless communication device of claim 11,
wherein each of the plurality of time domain units has a
duration of X time slots, where X is greater than or equal to
1.

13. The wireless communication device of claim 11,
wherein each of the plurality of time domain units has a
duration of X occasions of repetitive transmissions in time
domain, where X is greater than or equal to 1.

14. The wireless communication device of claim 11,
wherein
an n-th group of the N groups corresponds to an n-th
scheduling grant of the N scheduling grants, and
in the n-th group of the N groups, only repetitive transmissions scheduled by the n-th scheduling grant are
communicated between the wireless communication
device and the wireless communication node.

15. The wireless communication device of claim 11,
wherein an n-th scheduling grant and a (n+1)-th scheduling
grant of the N scheduling grants are associated with at least
one of:
different corresponding CORESET pool identifiers,
different corresponding CORESET identifiers,
a different time location for each of the n-th scheduling
grant and the (n+1)-th scheduling grant, or
a different time location for a first or last repetitive
transmission scheduled by each of the n-th scheduling
grant and the (n+1)-th scheduling grant.

16. The wireless communication device of claim 15,
wherein the n-th scheduling grant is configured with a
CORESET pool identifier or CORESET identifier of smaller
value than that of the (n+1)-th scheduling grant.

17. The wireless communication device of claim 15,
wherein at least one of:
the n-th scheduling grant occurs before the (n+1)-th
scheduling grant,
the n-th scheduling grant occurs after the (n+1)-th scheduling grant,
a first symbol of the n-th scheduling grant occurs before
a first symbol of the (n+1)-th scheduling grant,
a first symbol of the n-th scheduling grant occurs after a
first symbol of the (n+1)-th scheduling grant,
a last symbol of the n-th scheduling grant occurs before a
last symbol of the (n+1)-th scheduling grant,
a last symbol of the n-th scheduling grant occurs after a
last symbol of the (n+1)-th scheduling grant,
a first symbol of repetitive transmissions scheduled by the
n-th scheduling grant occurs before a first symbol of
repetitive transmissions scheduled by the (n+1)-th
scheduling grant,
a first symbol of repetitive transmissions scheduled by the
n-th scheduling grant occurs after a first symbol of
repetitive transmissions scheduled by the (n+1)-th
scheduling grant,
a last symbol of repetitive transmissions scheduled by the
n-th scheduling grant occurs before a last symbol of
repetitive transmissions scheduled by the (n+1)-th
scheduling grant, or
a last symbol of repetitive transmissions scheduled by the
n-th scheduling grant occurs after a last symbol of
repetitive transmissions scheduled by the (n+1)-th
scheduling grant.

18. A non-transitory computer readable medium storing
instructions, which when executed by at least one processor,
cause the at least one processor to:
receive, via a transceiver from a wireless communication
node, N scheduling grants to schedule a plurality of
repetitive transmissions of a same data block, wherein at least two of the repetitive transmissions overlap at a time instance, and N is greater than or equal to 2, wherein the N scheduling grants are associated with at least one identifier corresponding to at least one control resource set (CORESET), wherein the plurality of repetitive transmissions comprises N groups of repetitive transmissions, and each of the repetitive transmissions is located in one of a plurality of time domain units, and a first of the N groups includes repetitive transmissions in at least a first time domain unit, a (N+1)th time domain unit if the (N+1)th time domain unit exists, and a (2N+1)th time domain unit of the plurality of time domain units if the (2N+1)th time domain unit exists, and a second of the N groups includes repetitive transmissions in at least a second time domain unit, a (N+2)th time domain unit if the (N+2)th time domain unit exists, and a (2N+2)th time domain unit of the plurality of time domain units if the (2N+2)th time domain unit exists; and communicate, via the transceiver between the wireless communication device and the wireless communication node, only one of the at least two repetitive transmissions that overlap at the time instance.

\* \* \* \* \*